United States Patent
Chiba et al.

(10) Patent No.: US 6,326,623 B1
(45) Date of Patent: Dec. 4, 2001

(54) DUST RADIATION MONITOR APPARATUS AND DUST SAMPLING APPARATUS USED THEREFOR

(75) Inventors: Keiichi Chiba, Fuchu; Mitsuo Ishibashi; Yorimasa Endo, both of Tokorozawa; Eiji Noda, Fuchu; Yasuo Suzuki, Urawa; Noriyuki Seki, Tokyo; Akira Yunoki, Tokorozawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/292,330

(22) Filed: Apr. 15, 1999

(30) Foreign Application Priority Data

| Apr. 16, 1998 | (JP) | 10-106213 |
| Mar. 26, 1999 | (JP) | 11-083932 |
| Mar. 26, 1999 | (JP) | 11-083942 |
| Mar. 26, 1999 | (JP) | 11-083944 |

(51) Int. Cl.⁷ ................................................. G01T 1/20
(52) U.S. Cl. .................. 250/367; 250/435; 250/424; 250/363.02
(58) Field of Search ............................. 250/367, 435, 250/424, 363.02

(56) References Cited

U.S. PATENT DOCUMENTS 4,132,894 * 1/1979 Yule ....................... 250/435
5,442,180 * 8/1995 Perkins et al. ............ 250/367

FOREIGN PATENT DOCUMENTS

| 60-188869 | * 9/1985 | (JP) | 250/367 |
| 7-159540 | 6/1995 | (JP) | . |
| 8-285944 | 11/1996 | (JP) | . |
| 9-211133 | 8/1997 | (JP) | . |

* cited by examiner

Primary Examiner—Constantine Hannaher
Assistant Examiner—Andrew Israel
(74) Attorney, Agent, or Firm—Oblon, Spivak, McClelland, Maier & Neustadt, P.C.

(57) ABSTRACT

A pipe switching unit switches connections between the radiation monitor side and a plurality of sampling pipes which are installed in different sampling places to introduce air from the respective sampling places. An intermittent dust radiation monitor collect, in a dust collection section, dust in the air introduced through each sampling pipe sequentially switched by the pipe switching unit, and measures the radioactivity concentration of dust in the dust collection section. A continuous dust radiation monitor collects, in a dust collection section, dust in the air introduced through a fixed sampling pipe switched by the pipe switching unit, and measures the radioactivity concentration of dust in the dust collection section. With this arrangement, while intermittent measurement is performed in normal operation as in the prior art, the intermittent measurement is switched to continuous measurement, as needed, thereby improving the measurement precision.

36 Claims, 23 Drawing Sheets

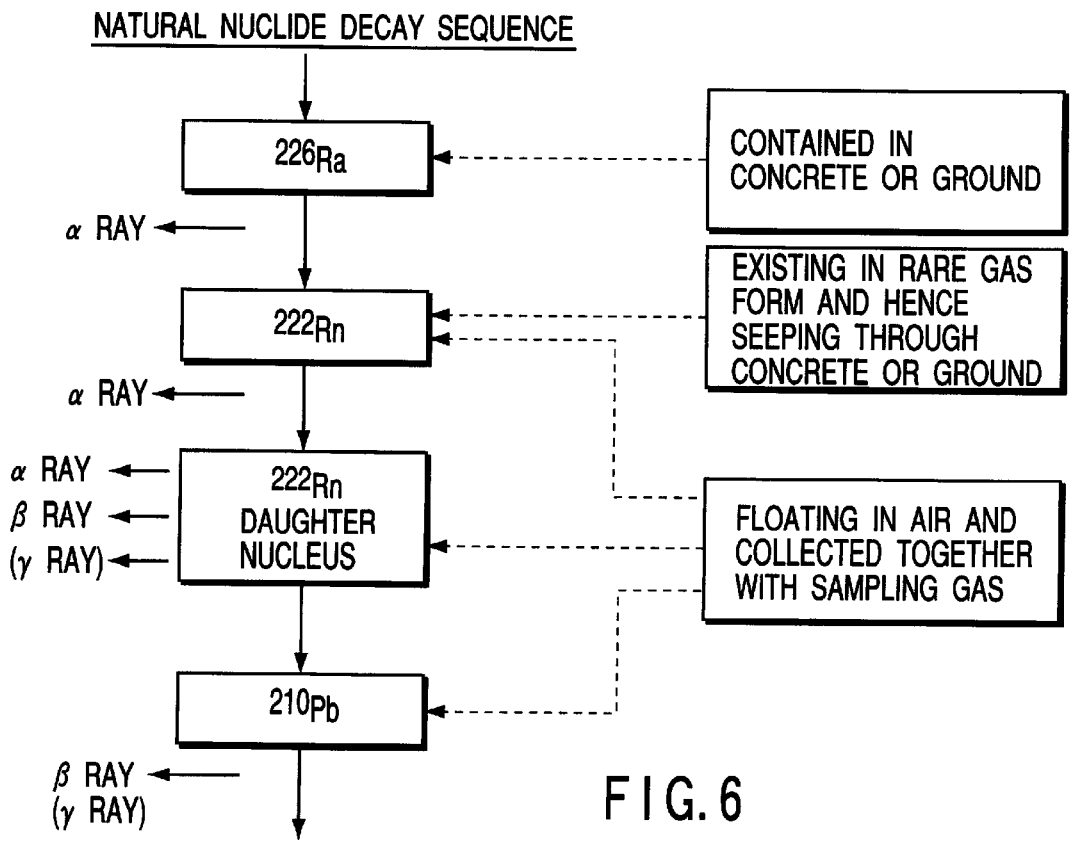
FIG. 6
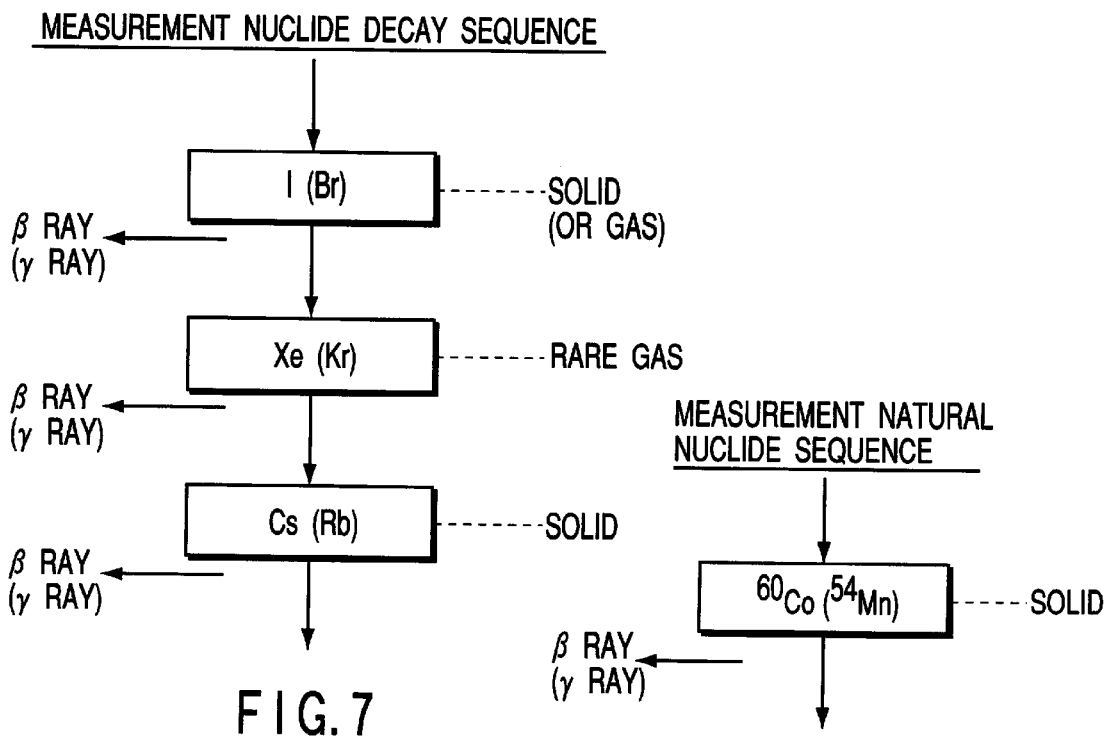
FIG. 7
FIG. 8

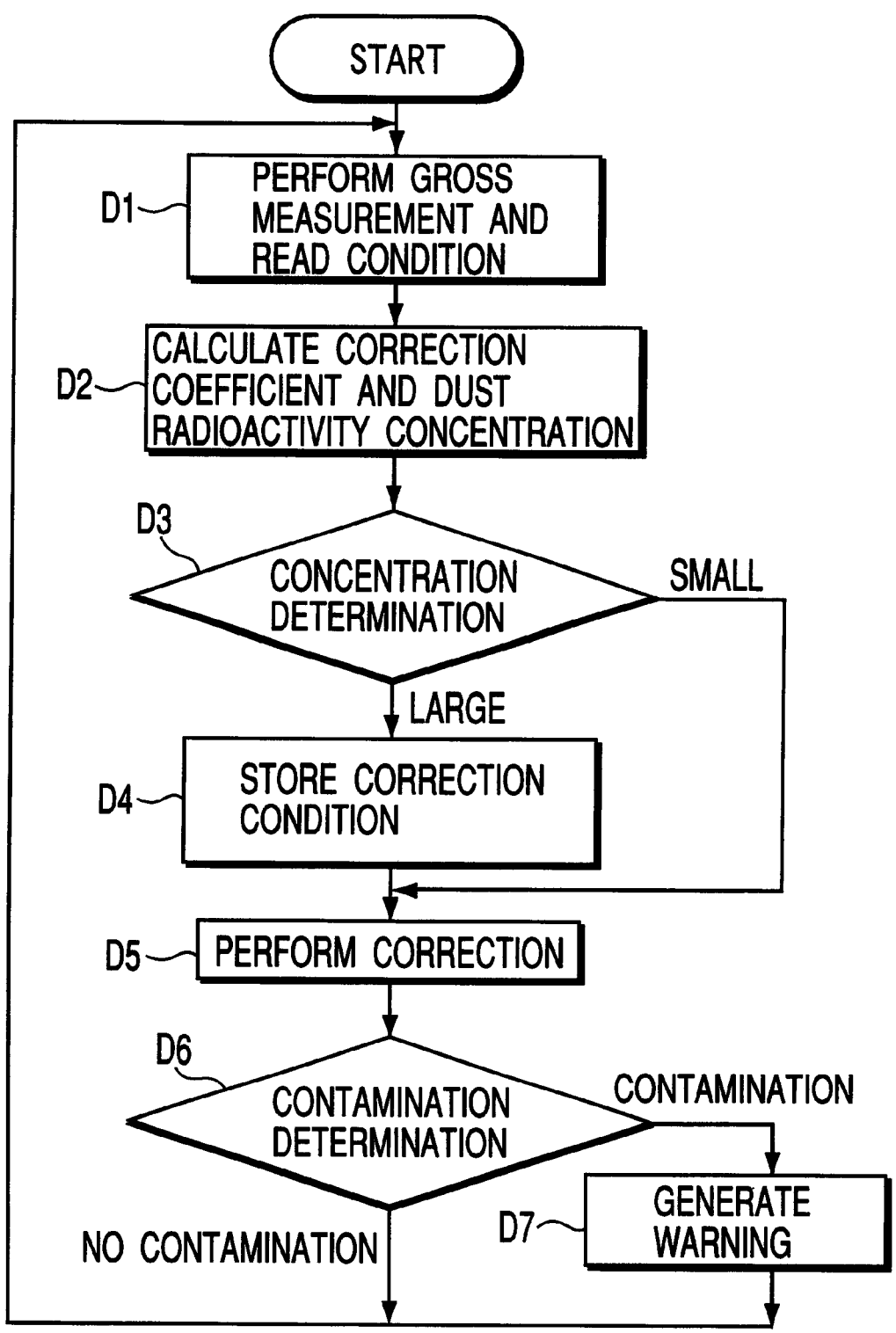
F I G. 14

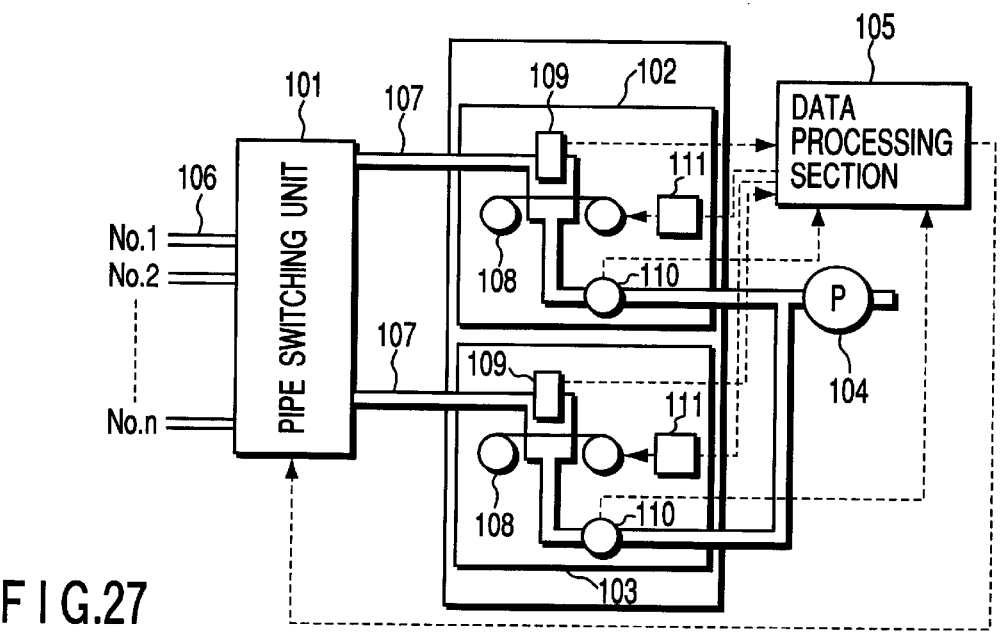
F I G. 27
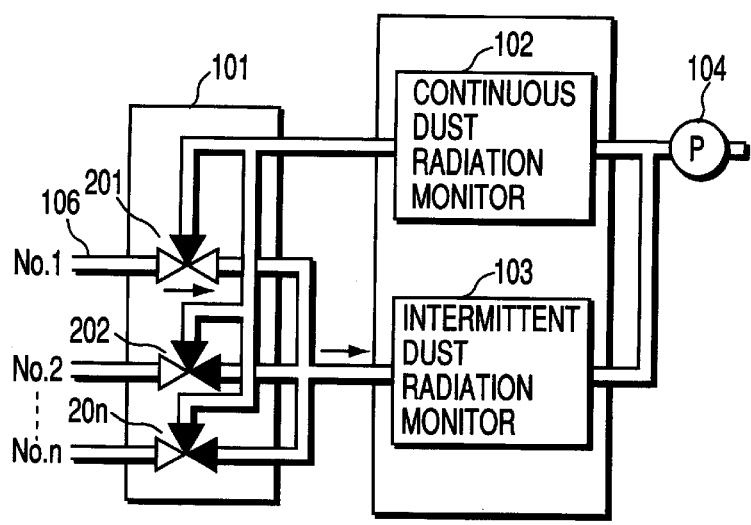
F I G. 29
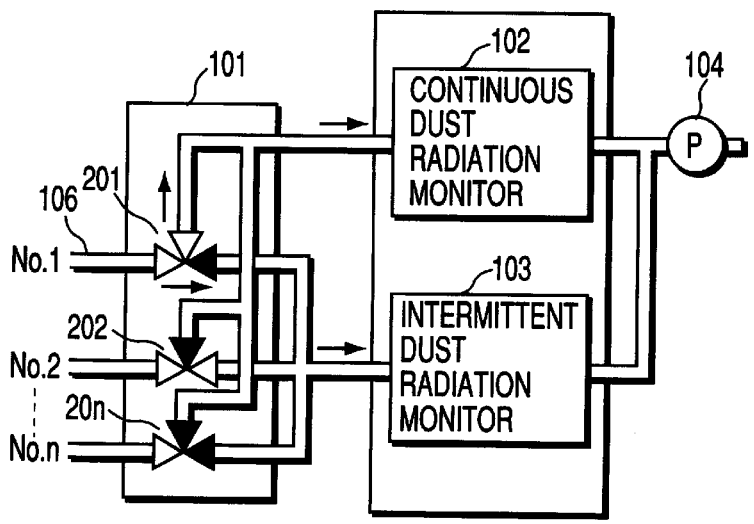
F I G. 30

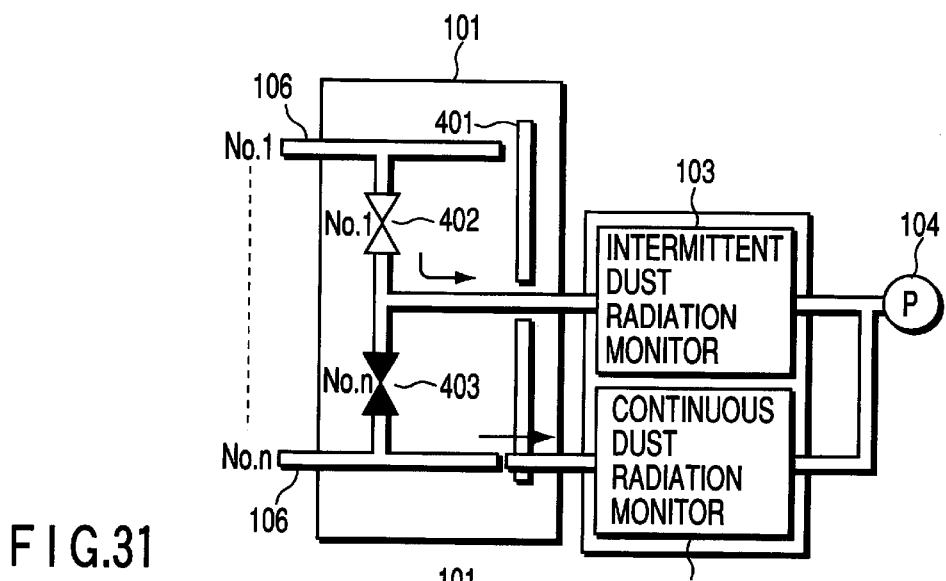
F I G. 31
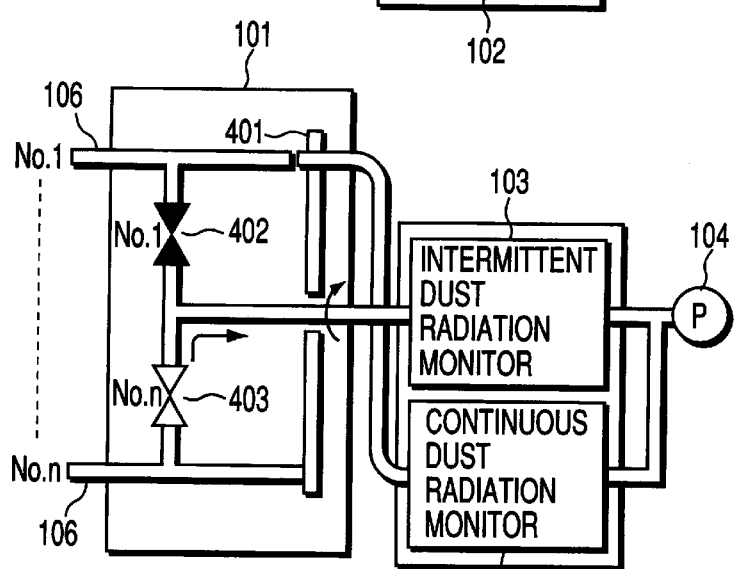
F I G. 32
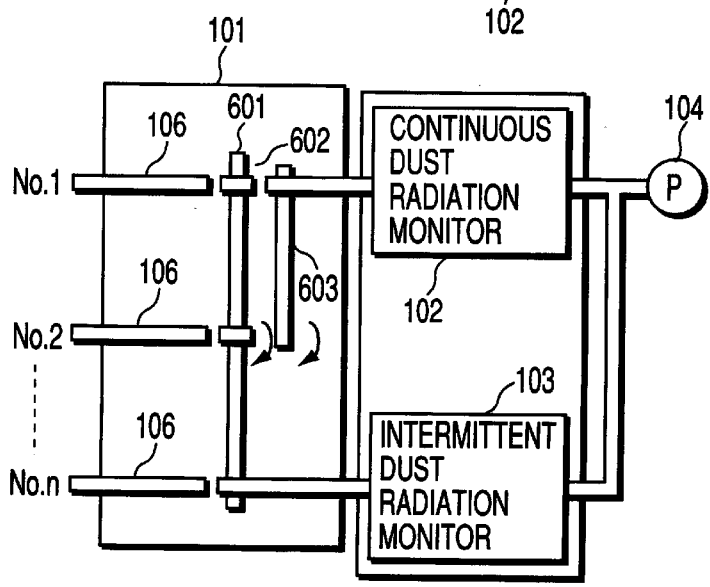
F I G. 33

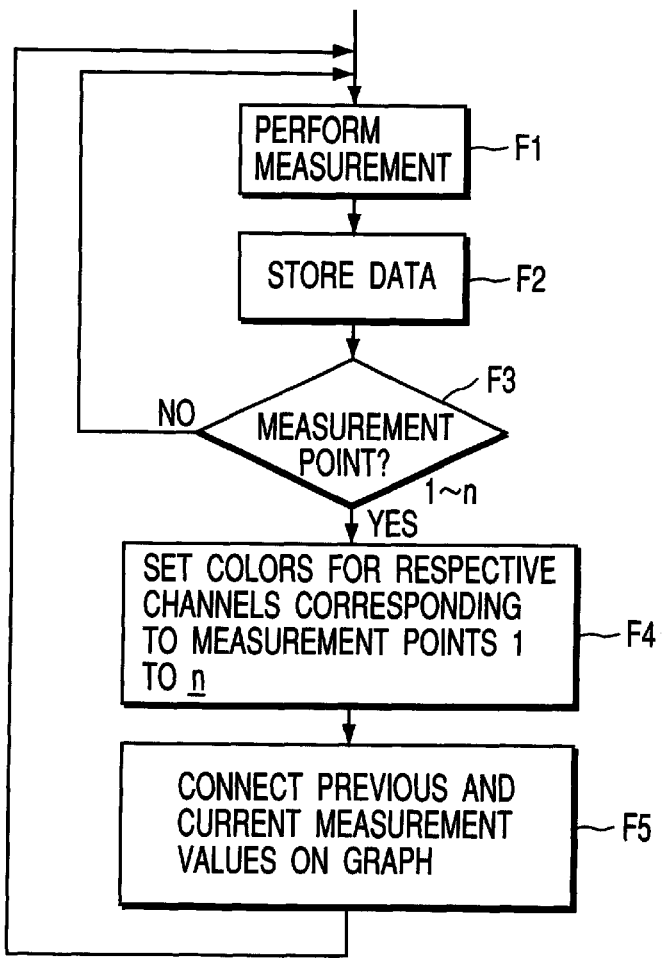
F I G. 34
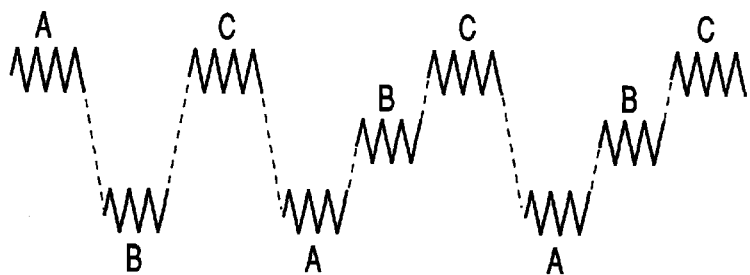
F I G. 35
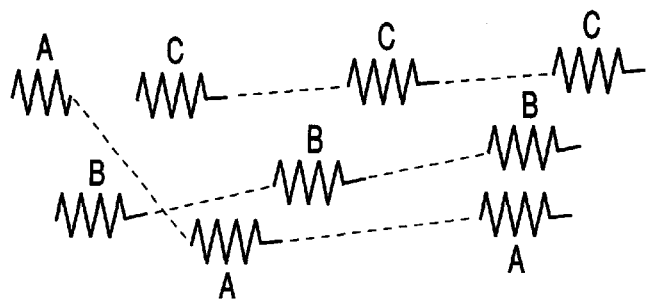
F I G. 36

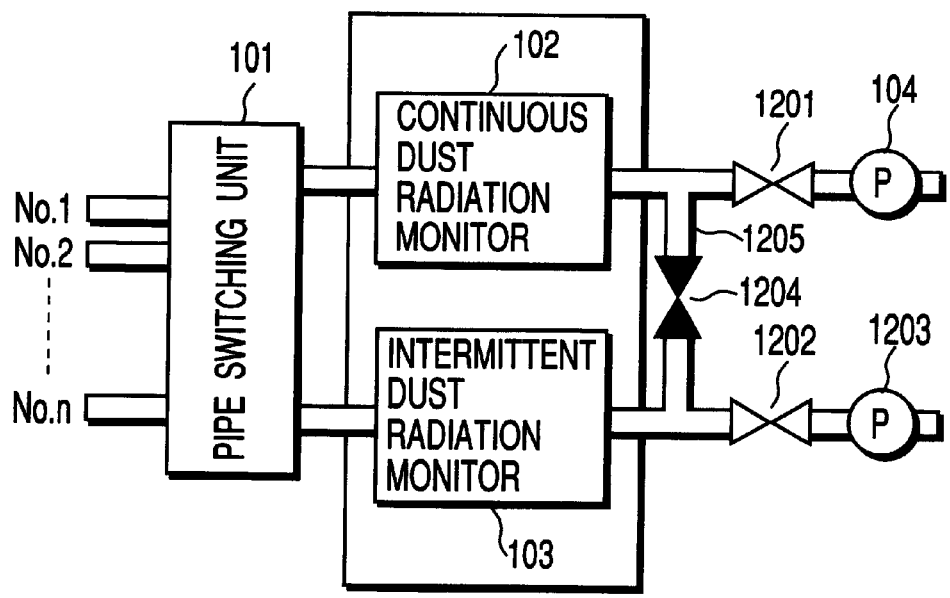
F I G. 37
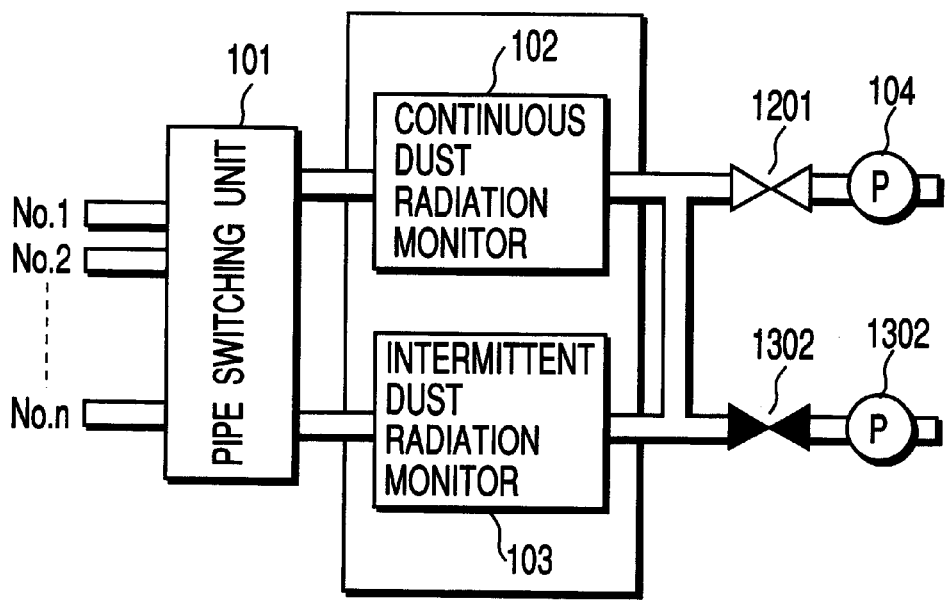
F I G. 38

DUST RADIATION MONITOR APPARATUS AND DUST SAMPLING APPARATUS USED THEREFOR

BACKGROUND OF THE INVENTION

The present invention relates to a dust radiation monitor apparatus used in radiation source handling facilities such as nuclear power plants to measure the radioactivity concentration of dust in the air in the facilities, and a dust sampling apparatus used in the dust radiation monitor apparatus.

Conventionally, in radiation source handling facilities such as nuclear power plants, dust radiation monitor apparatuses for measuring the radioactivity concentration of dust in the air in the facilities are widely used.

FIG. 1 is a schematic view showing an example of the arrangement of a dust radiation monitor apparatus widely used in practice in radiation source handling facilities such as nuclear power plants.

In the conventional dust radiation monitor apparatus in FIG. 1, when air is drawn into a chamber C through a sampling pipe 1, radiation dust in the air is collected through a filter (filter paper or the like) in a dust collection section 2. The air after dust collection is exhausted through a sampling pump 3. A β ray detection section 5 detects β rays from the radiation dust collected through the filter, and converts it into an electrical signal. When a β ray measurement value is obtained by a β ray measuring section 7, a data processing section 8 compares the measurement value with a warning set value and determines contamination if any.

Natural radioactive substances exist in nature. Radon is a naturally occurring substance (to be referred to as a natural nuclide hereinafter). Since radon exists in a rare gas form in nature, it also floats in the air in the facilities. A nuclide of this kind emits α and β rays in the process of decaying into a daughter nucleus and granddaughter nucleus.

The radiation dust collected by the above dust radiation monitor apparatus therefore contains natural nuclides. For this reason, as shown in FIG. 2, a total β ray measurement value Va includes a contribution V2 of natural nuclides as well as a contribution V1 of measurement nuclides due to leakage. Owing to the influences of such natural nuclides, many radioactive nuclides (artificial contamination nuclides) as measurement targets may be determined to exist in amounts larger than actual amounts. For this reason, the influences of natural nuclides must be separately evaluated.

As a technique of solving this problem, a technique of accurately determining the presence/absence of radioactive contamination without separately evaluating the influences of natural nuclides is disclosed in Jpn. Pat. Appln. KOKAI Publication No. 9-211133. According to this technique, α and β rays emitted from natural nuclides are separately measured in advance by a measurement system, and the emission ratio of the measured α and β rays from natural nuclides is obtained in advance. In actual contamination determination, radiation emitted from measurement targets is detected by a radiation detector, and α and β rays are separately measured from the detection signal. A correction processing means then obtains a β ray value base on natural nuclides which are contained in the β ray measurement value on the basis of the emission ratio of α and β rays and the α ray measurement value, and subtracts the β ray value base on natural nuclides from the β ray measurement value. As a result, a β ray value free from the influences of natural nuclides can be obtained.

In the dust radiation monitor apparatus disclosed in Jpn. Pat. Appln. KOKAI Publication No. 9-211133, however, α and β rays are measured by using a single radiation detector. More specifically, detection/measurement is performed by a single radiation detector having a detection section made up of two layers (α and β ray detection layers). For this reason, the following problems are posed.

(1) Low-energy β rays are absorbed by the α ray detection layer.

More specifically, with the structure formed by stacking the α and β ray detection layers on each other, β rays output from the dust collection section always reach the β ray detection layer through the a ray detection layer. The detection efficiency of low-energy β rays, which are easily absorbed, decreases, resulting in a measurement error.

(2) Separate measurement of α and β rays has its own limitation.

More specifically, light components from the α and β ray detection layers mix with each other. The mixed light components are separated by a subsequent circuit in accordance with differences in rise characteristics and emission amount, but they are not perfectly separated. Since α and β rays as measurement targets vary in energy, they mix with each other in a certain energy region, resulting in a measurement error. Especially, the low-energy side of a rays tend to mix with the high-energy side of β rays.

Demands therefore have arisen for a dust radiation monitor apparatus which has a structure that prevents light components from α and β ray detection layers from mixing with each other, and can eliminate any measurement error due to mixing of light components. Demands has also arisen for a dust radiation monitor apparatus which can prevent the other detection layer from absorbing β rays in detecting β rays, and improve the detection efficiency of low-energy β rays, thereby eliminating any measurement error due to β ray absorption.

In such a dust radiation monitor apparatus, the following problems arise in intermittent measurement and continuous measurement, in addition to the above problems of a decrease in detection efficiency and measurement errors.

FIG. 3 is a schematic view showing an example of the arrangement of a conventional intermittent dust radiation monitor apparatus.

Referring to FIG. 3, a pipe switching unit 1401 sequentially switches connections between the radiation monitor side and a plurality of (n) sampling pipes 1400 which are installed in different sampling places in radiation source handling facilities (not shown) to introduce air from the respective sampling places. As shown in FIG. 3, the pipe switching unit 1401 is constituted by a plurality of solenoid valves 1402.

The air introduced through the sampling pipes 1400 sequentially switched by the pipe switching unit 1401 is drawn by a pump 1406 through a pipe system and continuously sent to a dust collection section 1411. Dust in the air sent to the dust collection section 1411 is collected on filter paper 1403 driven by a filter paper driving section 1407.

In addition, the amount of air drawn is adjusted to a predetermined amount by a flow rate indicator 1404 and a flow rate control valve 1405.

Radiation from the dust collected on the filter paper 1403 is detected by a radiation detector 1410, and the radioactivity concentration of the dust on the filter paper 1403 is then measured by a data converter 1408 using the radiation reading from the radiation detector 1410. The measurement result is output to a display/recording section 1409.

Such an intermittent dust radiation monitor apparatus can perform only intermittent measurement. For this reason, the flow rate of air must be increased to a value equal to or more than a detection limit value, and the flow rate of air must be fixed to maintain a high detection precision.

Under the circumstances, a continuous dust radiation monitor apparatus is proposed, in which dust collection/measurement units are arranged for the respective sampling pipes to perform continuous measurement.

In such a continuous dust radiation monitor apparatus, however, since dust collection/measurement units equal in number to the sampling pipes must be installed, the apparatus arrangement becomes large in size.

Demands have therefore arisen for a dust radiation monitor apparatus which can switch intermittent measurement to continuous measurement to perform continuous monitoring, as needed, while intermittent measurement is performed in normal operation as in the prior art, thereby improving the measurement precision. In addition, demands have arisen for a dust radiation monitor apparatus which can collectively perform dust connection control and measurement processing for each of intermittent and continuous dust radiation monitors by intensively using one data processing section, and can change the schemes of the respective monitors according to the circumstances.

In dust sampling apparatus used in the above dust radiation monitor apparatus, the following problems arise in collecting dust with filter paper.

FIG. 4 shows the arrangement of a conventional dust sampling apparatus.

A chamber 901 is used to draw air from a predetermined place in a radiation management area and exhaust the air after dust collection. A filter paper holder 905 for holding filter paper 903 and a paper filter receiving wire net 904 is mounted in the chamber 901. The filter paper holder 905 is mounted on the chamber 901 through a paper filter holder O-ring 918. A radiation detector 902 for detecting radiation emitted from the dust collected by the filter paper 903 is mounted in the chamber 901. The radiation detector 902 is held by a detector holder 906, which is mounted on the chamber 901, through a detector O-ring 917.

In the dust sampling apparatus having this arrangement, when air is drawn through the inlet of the chamber 901, dust in the air is collected on the filter paper 903 in the filter paper holder 905, and the air after dust collection is exhausted from the outlet of the chamber 901.

In this conventional dust sampling apparatus, to increase the detection sensitivity, the distance between the filter paper 903 and the radiation detector 902 is reduced to several millimeters. Owing to this structure, the flow path of air passing through the filter paper 903 is not uniform, and dust is nonuniformly collected on the filter paper 903. As a result, the detection efficiency decreases due to self-absorption of dust, or a sensitivity calibration deviation occurs with respect to a calibration ray source.

Under the circumstances, demands have arisen for a dust sampling apparatus which can make the flow path of air passing through filter paper uniform, and can uniformly collect dust, thereby preventing a decrease in detection efficiency due to self-absorption of dust and a sensitivity calibration deviation with respect to a calibration ray source.

BRIEF SUMMARY OF THE INVENTION

Accordingly, it is an object of the present invention to provide a dust radiation monitor apparatus which has a structure that prevents light components from α and β ray detection layers from mixing with each other, and can eliminate any measurement error due to mixing of light.

It is another object of the present invention to provide a dust radiation monitor apparatus which can solve the problem associated with absorption of β rays by other detection layers in detecting β rays, and improve the detection efficiency of low-energy β rays, thereby eliminating any measurement error due to β ray absorption.

It is still another object of the present invention to provide a dust radiation monitor apparatus which can switch intermittent measurement to continuous measurement, as needed, to perform continuous monitoring while performing intermittent measurement in normal operation as in the prior art, thereby improving the measurement precision.

It is still another object of the present invention to provide a dust radiation monitor apparatus which can collectively perform dust collection control and measurement processing for intermittent and continuous radiation monitors by intensively using one data processing section, and can also change the schemes of the respective monitors according to the circumstances.

It is still another object of the present invention to provide a dust sampling apparatus which makes the flow path of air passing through filter paper uniform, and uniformly collect dust, thereby preventing a decrease in detection efficiency due self-absorption of dust and a sensitivity calibration deviation relative to a calibration ray source.

According to one aspect of the present invention, there is provided a dust radiation monitor apparatus for detecting radiation emitted from dust collected in a dust collection section and determining the presence/absence of radioactive contamination, comprising: an α ray detection section and β ray detection section having an α ray detection layer and β ray detection layer arranged to be substantially flush with each other and configured to independently detect α and β rays without mixing the rays; an α ray measuring section and β ray measuring section for separately obtaining an α ray measurement value and β ray measurement value from the independently detected α and β rays; and a data processing section for calculating a β ray value of a natural nuclide by multiplying the α ray measurement value by an emission ratio between α and β rays emitted from the natural nuclide which is obtained in advance as a correction coefficient, and performing contamination determination by using a value obtained by subtracting the calculated β ray value from the β ray measurement value.

According to another aspect of the present invention, there is provided a dust radiation monitor apparatus for detecting radiation emitted from dust collected in a dust collection section and determining the presence/absence of radioactive contamination, comprising: an α ray detection section and β ray detection section having an α ray detection layer and β ray detection layer arranged to be substantially flush with each other and configured to independently detect α and β rays without mixing the rays; an α ray measuring section and β ray measuring section for separately obtaining an α ray measurement value and β ray measurement value from the independently detected α and β rays; and a data processing section capable of selectively performing mode setting between a first mode of measuring a natural nuclide and a second mode of measuring a dust radioactivity concentration, the data processing section being configured to obtain an emission ratio of α and β rays emitted from the natural nuclide measured in the first mode as a correction coefficient, calculate a β ray value of the natural nuclide by multiplying the α ray measurement value measured in the second mode by the correction coefficient, and perform contamination determination by using a value obtained by subtracting the calculated β ray value from the β ray measurement value measured in the second mode.

According to still another aspect of the present invention, there is provided a dust radiation monitor apparatus for collecting dust in air into a dust collection section and measuring a radioactivity concentration of the dust by using a counted value of radiation from the dust in the dust collection section, comprising: pipe switching means for switching connections between a radiation monitor side and a plurality of sampling pipes which are installed in different sampling places in facilities to introduce air from the respective sampling places; an intermittent dust radiation monitor for collecting, in a dust collection section, dust in air which is introduced through the sampling pipes sequentially switched by the pipe switching means, and measuring a radioactivity concentration of the dust in the dust collection section; and a continuous dust radiation monitor for collecting, in a dust collection section, dust in air introduced through a fixed sampling pipe switched by the pipe switching means, and measuring the radioactivity concentration of the dust in the dust collection section.

According to still another aspect of the present invention, there is provided a dust radiation monitor apparatus for collecting dust in air into a dust collection section and measuring a radioactivity concentration of the dust by using a counted value of radiation from the dust in the dust collection section, comprising: pipe switching means for switching connections between a radiation monitor side and a plurality of sampling pipes which are installed in different sampling places in facilities to introduce air from the respective sampling places; an intermittent dust radiation monitor for collecting, in a dust collection section, dust in air which is introduced through the sampling pipes sequentially switched by the pipe switching means, and measuring a radioactivity concentration of the dust in the dust collection section; a continuous dust radiation monitor for collecting, in a dust collection section, dust in air introduced through a fixed sampling pipe switched by the pipe switching means, and measuring the radioactivity concentration of the dust in the dust collection section; and a data processing section for collectively performing dust collection control and measurement control for each of the intermittent dust radiation monitor and the continuous dust radiation monitor.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air; a radiation detector mounted in the chamber, for detecting radiation from the captured radiation dust; and a member mounted in the chamber, for agitating a flow path of drawn air.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air; a radiation detector mounted in the chamber, for detecting radiation from the captured radiation dust; and a detector holder for holding the radiation detector, wherein the filter paper holder and the detector holder have structures that agitate the flow path of drawn air when the air passes between the filter paper holder and the detector holder.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air; a radiation detector mounted in the chamber, for detecting radiation from the captured radiation dust; and a member which is provided between the radiation detector and the filter paper to agitate a flow path of drawn air.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air, and holding a filter paper receiving member acting to reduce pressure loss toward a center of the filter paper; and a radiation detector mounted in the chamber, for detecting radiation from the captured radiation dust.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air, and holding pressure loss correction filter paper acting to reduce a pressure loss toward a center of the filter paper; and a radiation detector mounted in the chamber, for detecting radiation from the captured radiation dust.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air; a radiation detector mounted in the chamber, for detecting radiation from the captured radiation dust; and a pipe which is installed on an air outlet side of the filter paper to increase a flow rate of air toward a center of the filter paper.

According to still another aspect of the present invention, there is provided a dust sampling apparatus comprising: a chamber for drawing external air and exhausting the air after radiation dust capturing to the outside; a filter paper holder mounted in the chamber, for holding filter paper for capturing radiation dust from the drawn air; a radiation detector mounted in the chamber, for detecting radiation from the captured radiation dust; a detector holder for holding the radiation detector; and a driving section for allowing adjustment of a distance between the paper filter and the radiation detector by moving the detector holder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 6 is a view for explaining the decay process of a natural nuclide;

FIG. 7 is a view for explaining the decay process of a measurement nuclide generated due to leakage;

FIG. 8 is a view for explaining the decay process of a measurement nuclide generated due to leakage;

FIG. 14 is a flow chart showing the processing performed by a data processing section according to the fifth embodiment of the present invention;

FIG. 27 is a schematic view showing an example of the arrangement of a dust radiation monitor apparatus according to the 14th embodiment of the present invention;

FIG. 29 is a schematic view showing an example of a pipe switching unit in a dust radiation monitor apparatus according to the 15th embodiment of the present invention;

FIG. 30 is a schematic view showing another example of the pipe switching unit in the dust radiation monitor apparatus according to the 15th embodiment of the present invention;

FIG. 31 is a schematic view showing an example of a pipe switching unit in a dust radiation monitor apparatus according to the 16th embodiment of the present invention;

FIG. 32 is a schematic view showing another example of the pipe switching unit in the dust radiation monitor apparatus according to the 16th embodiment of the present invention;

FIG. 33 is a schematic view showing an example of a pipe switching unit in a dust radiation monitor apparatus according to the 17th embodiment of the present invention;

FIG. 34 is a flow chart for explaining a dust radiation monitor apparatus according to the 18th embodiment of the present invention;

FIG. 35 is a schematic view for explaining the dust radiation monitor apparatus according to the 18th embodiment of the present invention;

FIG. 36 is a schematic view for explaining the dust radiation monitor apparatus according to the 18th embodiment of the present invention;

FIG. 37 is a schematic view showing an example of the arrangement of pumps installed in a dust radiation monitor apparatus according to the 19th embodiment of the present invention;

FIG. 38 is a schematic view showing an example of the arrangement of pumps installed in a dust radiation monitor apparatus according to the 20th embodiment of the present invention;

DETAILED DESCRIPTION OF THE INVENTION

The embodiments of the present invention will be described below with reference to the with reference to the views of the accompanying drawing.

(First Embodiment)

The first embodiment will be described first.

Figure 5:
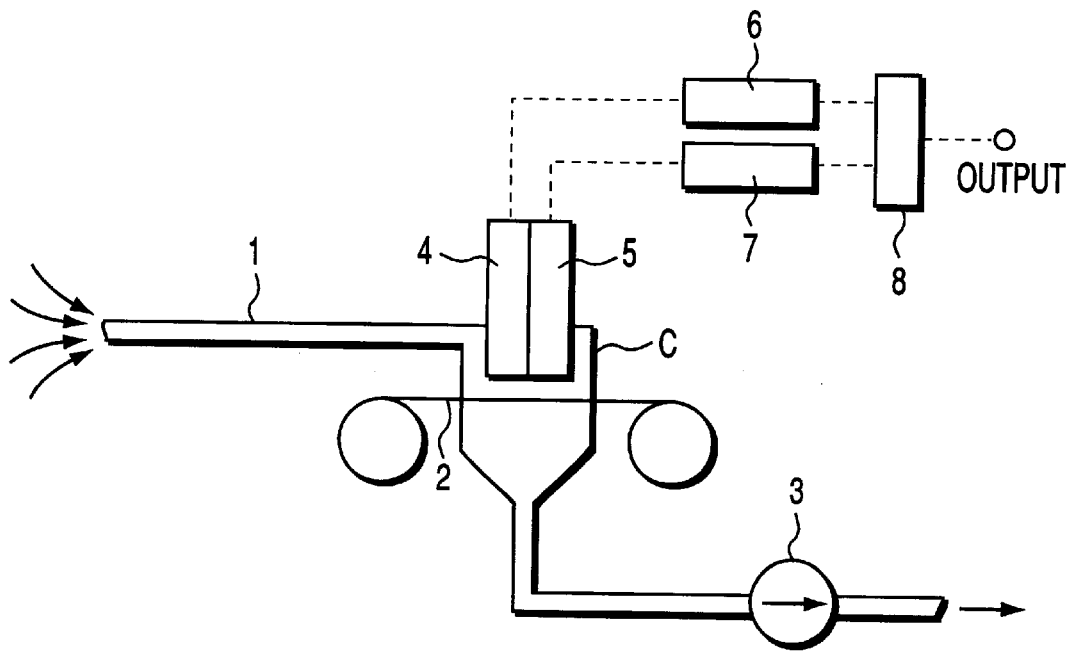
FIG. 5 is a schematic view showing an example of the arrangement of a dust radiation monitor apparatus according to the first embodiment of the present invention.

FIG. 5 is a schematic view showing an example of the arrangement of a dust radiation monitor apparatus according to the first embodiment.

Referring to FIG. 5, a chamber C blocks external radiation, takes in gases such as air, and exhausts gases after dust collection.

A sampling pipe 1 guides the gas at a predetermined place in a radiation management area into the chamber C.

A dust collection section 2 collects dust in the gas drawn into the chamber C through the sampling pipe 1 by using a sheet-like filter (filter paper or the like), and has a mechanism for moving the filter at predetermined time intervals. A sampling pump 3 is used to draw a gas into the chamber C and exhaust it to the outside.

An $\alpha$ ray detection section 4 independently detects $\alpha$ rays from the dust collected by the filter. The $\alpha$ rays detected by the $\alpha$ ray detection section 4 are converted into an electrical signal. This signal is output as a detection signal. A $\beta$ ray detection section 5 independently detects $\beta$ rays from the dust collected by the filter. The $\beta$ rays detected by the $\beta$ ray detection section 5 are converted into an electrical signal. This signal is output as a detection signal.

Note that the $\alpha$ ray detection section 4 and the $\beta$ ray detection section 5 are arranged in parallel, and their detection layers are flush with each other. With this structure, light from the detection layer of the $\alpha$ ray detection section 4 does not mix with light from the detection layer of the $\beta$ ray detection section 5, and hence $\alpha$ and $\beta$ rays can be independently detected.

An $\alpha$ ray measuring section 6 measures $\alpha$ rays on the basis of the detection signal from the $\alpha$ ray detection section 4, and outputs an $\alpha$ ray measurement value. A $\beta$ ray measuring section 7 measures $\beta$ rays on the basis of the detection signal from the $\beta$ ray detection section 5, and output a $\beta$ ray measurement value.

A data processing section 8 has two modes, i.e., a natural nuclide measuring mode and a dust radioactivity concentration measuring mode, and can set a desired one of the modes. The data processing section 8 obtains a $\beta$ ray value, excluding the influences of natural nuclides, by performing a predetermined calculation (to be described later) on the basis of the $\alpha$ ray measurement value and $\beta$ ray measurement value measured when each of the modes, i.e., the natural nuclide measuring mode and the dust radioactivity concentration measuring mode, is set. The data processing section 8 also compares the measurement value obtained by the calculation with a warning set value and determines contamination if any.

A measurement nuclide generated upon leakage emits no $\alpha$ ray. In contrast to this, a natural nuclide emits $\alpha$ rays in the decay process. Such properties will be described in detail with reference to FIGS. 6 and 7.

FIG. 6 shows the decay process of a natural nuclide. As shown in FIG. 6, $^{226}$Ra, which is a natural nuclide, is contained in concrete, soil, or the like, and becomes $^{222}$Rn in a half-life of 1,602 years (stable state). In this process, $\alpha$ rays are emitted. Since $^{222}$Rn is a rare gas, some seeps through concrete or soil and floats in the air. This nuclide becomes the daughter nucleus $^{222}$Rn in a half-life of 3.8 days (metastable state). In this process as well, $\alpha$ rays are emitted. Since the daughter nucleus $^{222}$Rn floats in the air, $^{222}$Rn is collected together with a sampling gas. $\alpha$, $\beta$, and $\gamma$ rays are emitted from this daughter nucleus $^{222}$Rn. The daughter nucleus $^{222}$Rn becomes $^{210}$Pb in a half-life of the order of seconds to minutes (unstable state). In addition, $\beta$ and $\gamma$ rays are emitted in the decay process of $^{210}$Pb with a half-life of 20.4 years (stable state).

FIGS. 7 and 8 show the decay processes of measurement nuclides generated upon leakage. As shown in FIG. 7, I and Br (radioisotopes of iodine and bromine; solids) as measurement nuclides become Xe and Kr (rare gases) in the decay processes. In this case, $\beta$ and $\gamma$ rays are emitted. Xe and Kr become Cs and Rb (solids) in the next decay processes. In this case as well, $\beta$ and $\gamma$ rays are emitted. In addition, in the decay processes of Cs and Rb, $\beta$ and $\gamma$ rays are emitted. As shown in FIG. 8, when $^{60}$Co and $^{54}$Mn as measurement nuclides decay, $\beta$ and $\gamma$ rays are emitted.

As described above, measurement nuclides generated upon leakage emit no $\alpha$ rays, but natural nuclides emit $\alpha$ rays in their decay processes. In this embodiment, by using these properties, a $\beta$ ray value free from the influences of natural nuclides is obtained according to the following calculation.

The emission ratio (measurement contribution ratio to be used as a correction coefficient later) of $\alpha$ and $\beta$ rays emitted from natural nuclides is obtained in advance on the basis of the $\alpha$ ray measurement value and $\beta$ ray measurement value measured in the natural nuclide measurement mode. The $\alpha$ ray measurement value measured in the dust radioactivity concentration measurement mode is multiplied by the above measurement contribution ratio to calculate a $\beta$ ray value base on natural nuclides. The calculated $\beta$ ray value is then subtracted from the $\beta$ ray measurement value measured in the dust radioactivity concentration measurement mode to obtain a $\beta$ ray value free from the influences of natural nuclides.

Figure 9:
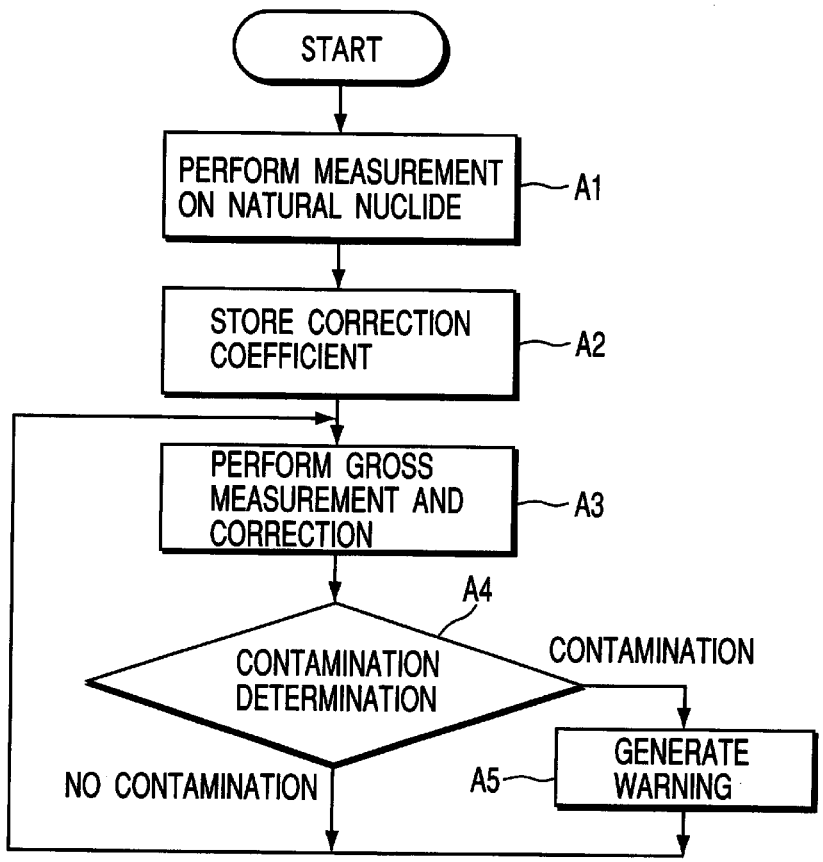
FIG. 9 is a flow chart showing the processing performed by a data processing section according to the first embodiment of the present invention.

FIG. 9 is a flow chart showing the process performed in the data processing section 8 in the first embodiment.

First of all, a $\alpha$ ray measurement value Nb($\alpha$) and a $\beta$ ray measurement value Nb($\beta$) of natural nuclides are measured in the natural nuclide measurement mode (step A1). K=Nb($\beta$)/Nb($\alpha$) is then calculated, and the resultant data is stored as a correction coefficient K in a memory or the like in advance (step A2). This correction coefficient K is based on actual measurement, and has high reliability.

After an α ray measurement value Ng(α) and β ray measurement value Ng(β) of a measurement target are measured in the dust radioactivity concentration measurement mode, a β ray value Ns(β)=Ng(β)−K·Ng(α) free from the influences of natural nuclides is obtained on the basis of these values (step A3). In this manner, the β ray measurement value is corrected.

That is, after the β ray value base on natural nuclides is calculated by multiplying the α ray measurement value Ng(α) measured in the dust radioactivity concentration measurement mode by the correction coefficient K, the calculated β ray value is subtracted from the β ray measurement value Ng(β) measured in the dust radioactivity concentration measurement mode, thereby obtaining the β ray value Ns(β) free from the influences of natural nuclides.

Subsequently, contamination determination is performed by comparing Ns(β) obtained by the above process with a predetermined warning reference value (step A4). If it is determined that no contamination has occurred, the flow returns to step A3 to calculate Ns(β) again. In contrast to this, if it is determined that contamination has occurred, a warning is generated (step A5). Thereafter, the flow returns to step A3 to calculate Ns(β) again.

Figure 1:
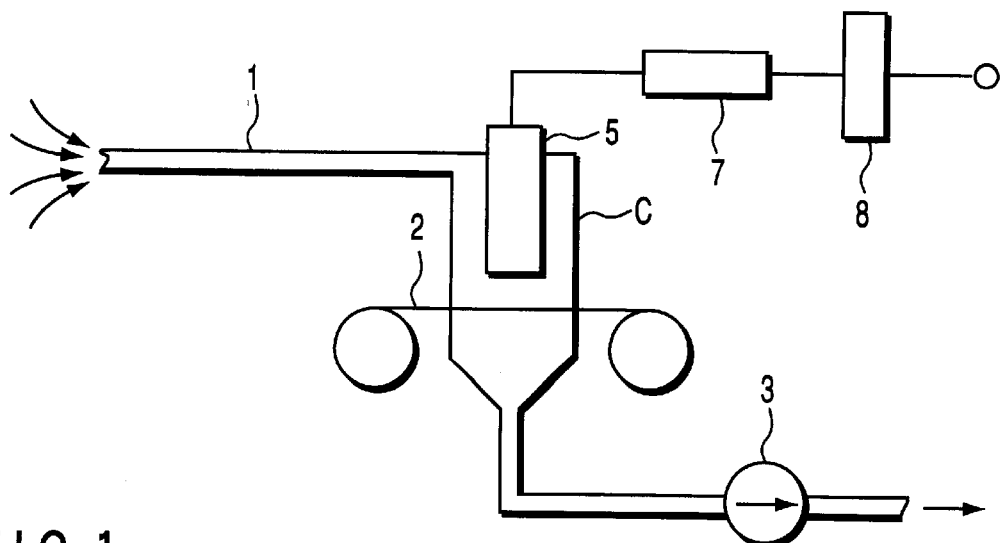
FIG. 1 is a schematic view showing an example of the arrangement of a dust radiation monitor apparatus widely used in radiation source handling facilities such as nuclear power plants.
Figure 2:
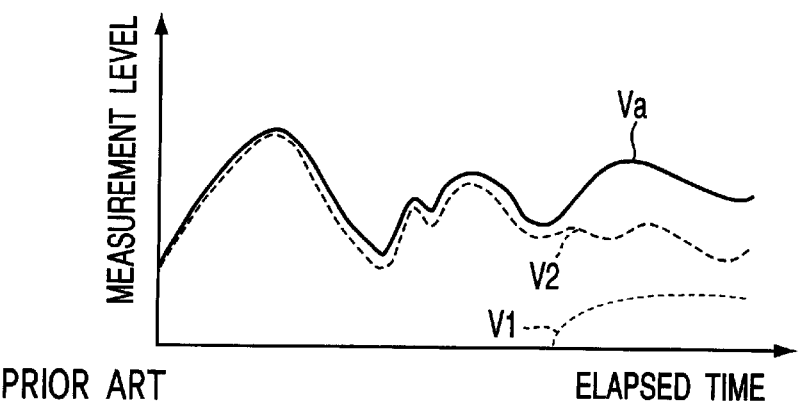
FIG. 2 is a graph for explaining contribution of natural nuclides in a β ray measurement value.
Figure 3:
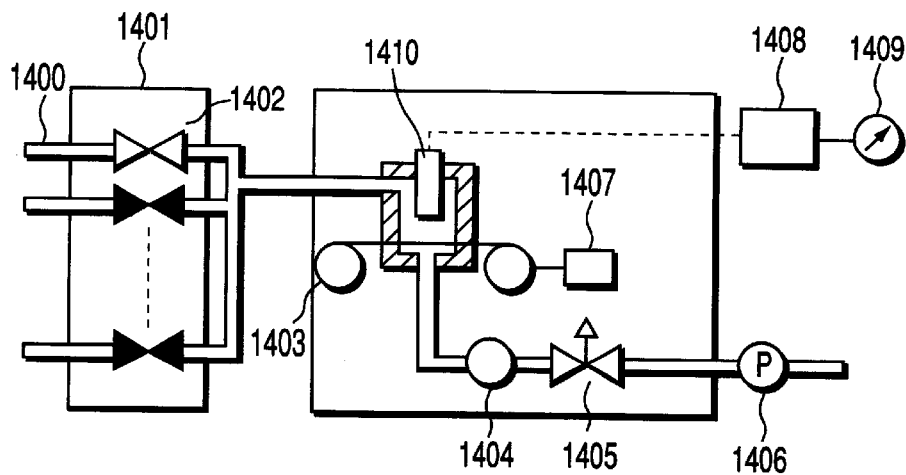
FIG. 3 is a schematic view showing an example of the arrangement of a conventional dust radiation monitor apparatus.
Figure 4:
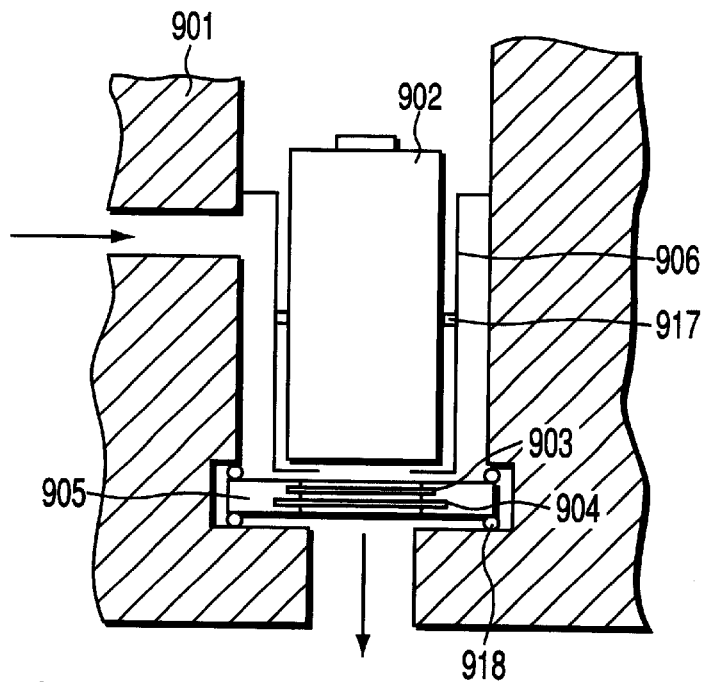
FIG. 4 is a view showing an example of the arrangement of a conventional dust sampling apparatus.

According to the first embodiment, α and β rays are independently detected and measured without mixing light from the detection layer of the α ray detection section 4 with light from the detection layer of the β ray detection section 5, and the correction process is performed to obtain the β ray value (a contribution V1 of a measurement nuclide generated upon leakage in FIG. 2) free from the influences of natural nuclides. Therefore, the precision of contamination determination can be further improved as compared with the prior art.

In addition, since the natural nuclide measurement mode and the dust radioactivity concentration measurement mode can be selectively set, the correction coefficient based on the measured value of a natural nuclide can be obtained. Hence, a high-precision correction value can be obtained.

Note that the first embodiment described above can be selectively combined with various embodiments described below and practiced.

(Second Embodiment)

The second embodiment will be described next.

In the second embodiment, the data processing section 8 in the first embodiment further includes the function of precisely evaluating changes in various conditions serving as factors that cause variations in a natural nuclide and correcting changes in a correction coefficient that result from the changes in various conditions. Note that a detailed description of portions common to the first embodiment will be omitted. The differences between the first and second embodiments will be mainly described below.

Figure 10:
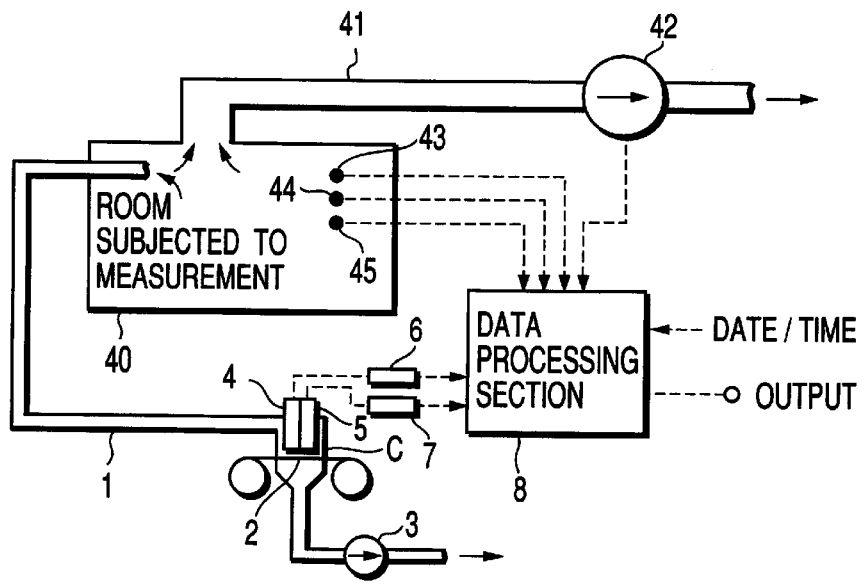
FIG. 10 is a schematic view showing an example of the arrangement of a dust radiation monitor apparatus according to the second embodiment of the present invention.

FIG. 10 is a schematic view showing an example of the arrangement of a dust radiation monitor apparatus according to the second embodiment.

Referring to FIG. 10, the inlet of a sampling pipe 1 is attached to a room 40 that is the measurement target of the dust radiation monitor apparatus. The gas in the room 40 is sent to a chamber C through the sampling pipe 1. The inlet of a ventilating duct 41 is also attached to the room 40. The gas in the room 40 is exhausted to the outside by a ventilating blower 42 through the ventilating duct 41.

A temperature sensor 43, a humidity sensor 44, and an atmospheric pressure sensor 45 are mounted in the room 40. The detection signals obtained by the respective sensors are sent to a data processing section 8. An operation state signal indicating the active/inactive state of the ventilating blower 42 is sent from the ventilating blower 42 to the data processing section 8.

The data processing section 8 has the function of precisely evaluating changes in various conditions serving as factors that cause variations in a natural nuclide and correcting changes in a correction coefficient which result from the changes in various conditions. The data processing section 8 obtains an α ray measurement value and β ray measurement value from an α ray measuring section 6 and β ray measuring section 7, and also obtains information indicating the operation state of the ventilating blower 42. In addition, the data processing section 8 obtains temperature, humidity, and atmospheric pressure data from the temperature sensor 43, humidity sensor 44, and atmospheric pressure sensor 45. Furthermore, the data processing section 8 internally or externally obtains current date/time data. The data processing section 8 corrects a correction coefficient K to an appropriate value in accordance with these conditions (the operation state of the ventilating blower 42 and the temperature/humidity/atmospheric pressure in the room 40, and the date/time).

Figure 11:
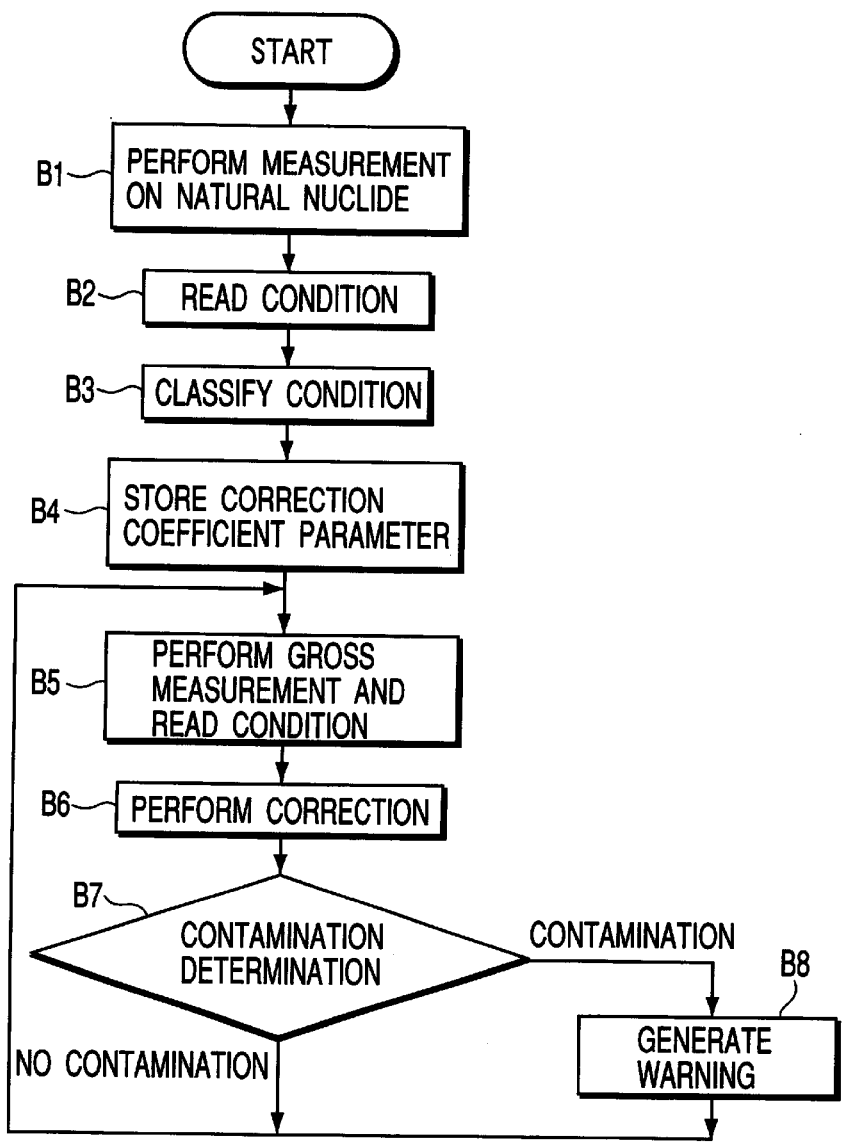
FIG. 11 is a flow chart showing the processing performed by a data processing section according to the second embodiment of the present invention.

FIG. 11 is a flow chart showing the process performed in the data processing section 8 in the second embodiment.

First of all, an α ray measurement value Nb(α) and a β ray measurement value Nb(β) are measured in the natural nuclide measurement mode (step B1).

The data processing section 8 then selectively read all or some of various conditions (the operation state of the ventilating blower 42, the temperature/humidity/atmospheric pressure in the room 40, and the date/time) (step B2), and classifies the values of the respective conditions (step B3).

In this embodiment, a correction coefficient $K(x1, x2, \ldots)$ obtained by correcting the above correction coefficient K=Nb(β)/Nb(α) is prepared in consideration of various conditions. This correction coefficient $K(x1, x2, \ldots)$ is expressed by a predetermined mathematical expression as a function of conditions $x1, x2, \ldots$. After the values of the respective conditions are classified, the value of the correction coefficient $K(x1, x2, \ldots)$ is calculated by using this mathematical expression and stored in a memory or the like in advance (step B4). At the same time, the values of the conditions $x1, x2, \ldots$ are also stored in the memory or the like.

Subsequently, an α ray measurement value Ng(β) and β ray measurement value Ng(β) are measured in the dust radioactivity concentration measurement mode, and the values of the conditions $x1, x2, \ldots$ are read out (step B5). Thereafter, in correction processing, a β ray value Ns(β)= Ng(β)−K(x1, x2, …)·Ng(α) free from the influences of natural nuclides is obtained on the basis of these values (step B6).

After this operation, contamination determination is performed by comparing Ns(β) obtained by the above processing with a predetermined warning reference value (step B7). If it is determined that no contamination has occurred, the flow returns to step B5. If it is determined that contamination has occurred, a warning is generated (step B5). The flow then returns to step B5.

According to the second embodiment, since changes in various conditions serving as factors that cause variations in a natural nuclide are precisely evaluated, and changes in a correction coefficient which are accounted for the changes in various conditions are corrected, high-precision measurement can be implemented in addition to the effects of the first embodiments.

(Third Embodiment)

Third embodiment will be described next.

In the third embodiment, the data processing section 8 in the second embodiment further includes the function of correcting changes in a correction coefficient which occur with a lapse of time from the start time of the active/inactive state of the ventilating blower 42. Note that a detailed description of portions common to the above embodiments will be omitted. The differences between the above embodiments and the third embodiments will be mainly described below.

The air in a room 40 in FIG. 10 contains natural nuclides such as $^{222}$Rn that seeps through the ground, the concrete floor or wall, or the like. When a ventilating blower 42 for exhausting air containing such natural nuclides out of the room is operated and stopped, the concentration of the natural nuclide in the air changes. As a result, the correction coefficient changes.

Figure 12:
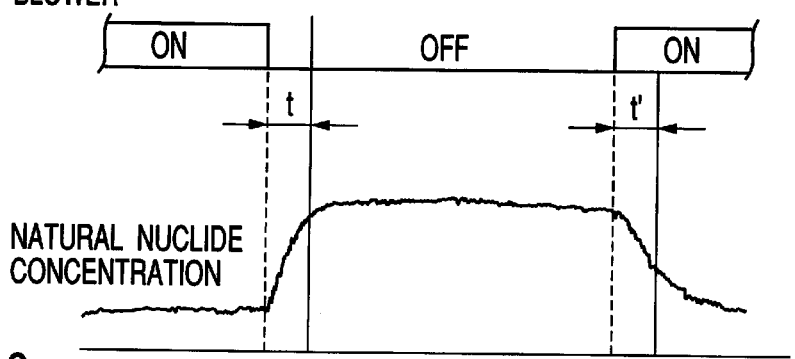
FIG. 12 is a timing chart showing how the concentration of a natural nuclide changes with an elapsed time from the start of the active/inactive state of a ventilating blower in the third embodiment of the present invention.

FIG. 12 is a timing chart showing how the natural nuclide concentration changes with a lapse of time from the start time of the active/inactive state of the ventilating blower 42.

Referring to FIG. 12, when the ventilating blower 42 in operation is stopped, the concentration of the natural nuclide increases with an elapsed time t from the stop time, and gradually stabilizes. When the ventilating blower 42 at a standstill operates, the concentration of the natural nuclide decreases with an elapsed time t' from the start time, and gradually stabilizes.

Since the concentration of the natural nuclide changes with an elapsed time from the start of the active/inactive state of the ventilating blower 42, the correction coefficient also changes. For this reason, in this embodiment, the relationship between the elapsed times t and t' from the start of the active/inactive state of the ventilating blower 42 and the concentration of the natural nuclide is evaluated, and the correction coefficient to be corrected is defined as a function of the elapsed times t and t' on the basis of the evaluation result.

A data processing section 8 can acquire information indicating the start time of the active/inactive state of the ventilating blower 42 on the basis of the signal (the operation state signal indicating the operation state of the ventilating blower 42) sent from the ventilating blower 42. With this operation, the data processing section 8 calculates the correction coefficient as a function of the elapsed times t and t' in accordance with the elapsed times from the start of the active/inactive state of the ventilating blower 42. The data processing section 8 then calculates a β ray value free from the influences of natural nuclides on the basis of the correction coefficient, and performs contamination determination and the like.

According to the third embodiment, the relationship between the elapsed times from the start of the active/inactive state of the ventilating blower 42 and the concentration of the natural nuclide is evaluated, and a change in the correction coefficient which is attributed to a change in the concentration of the natural nuclide is corrected. In addition to the effects of the first and second embodiments, high-precision measurement can be implemented.

(Fourth Embodiment)

The fourth embodiment will be described next.

In the fourth embodiment, the data processing section 8 in the second embodiment further includes the function of storing conditions before correction processing when a correction coefficient is larger than a predetermined value. Note that a detailed description of portions common to the above embodiments will be omitted. The differences between the above embodiments and the fourth embodiments will be mainly described below.

Figure 13:
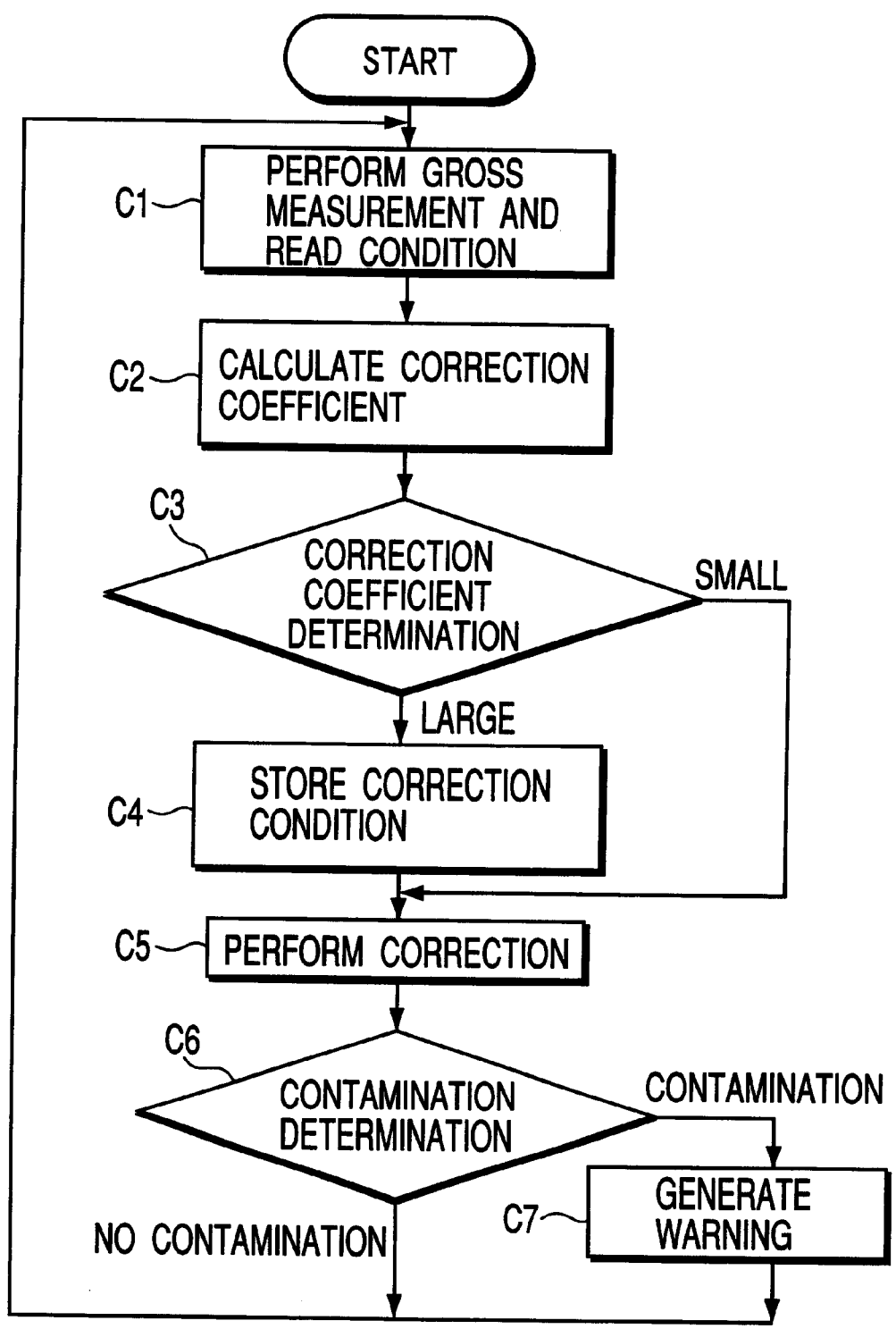
FIG. 13 is a flow chart showing the processing performed by a data processing section according to the fourth embodiment of the present invention.

FIG. 13 is a flow chart showing the process performed in a data processing section 8 according to the fourth embodiment.

Note that the processing (natural nuclide measurement, a read of conditions, classification of the conditions, and storage of correction parameters) in the natural nuclide measurement mode is the same as that in steps B1 to B4 in FIG. 11 in the second embodiment, and hence a description thereof will be omitted.

In the dust radioactivity concentration measurement mode, the α ray measurement value and β ray measurement value of a measurement target are measured, and the values of conditions x1, x2, . . . are read (step C1). Correction processing is not performed immediately after this step, but the following processing is performed before the correction processing.

The correction coefficient K(x1, x2, . . . ) is calculated on the basis of the values of the conditions x1, x2, . . . (step C2). It is then checked whether the correction coefficient is larger than a predetermined value (step C3). If it is determined that the correction coefficient is larger than the predetermined value, the values of the conditions x1, x2, . . . associated with the correction coefficient are stored (step C4). If the correction coefficient is smaller than the predetermined value, no storage operation is performed.

Subsequently, as in the second embodiment described above, a β ray value free from the influences of natural nuclides is obtained in the correction processing (step C5). Contamination determination is performed by comparing the β ray value obtained by the above processing with a predetermined warning reference value (step C6). If it is determined that contamination has occurred, a warning is generated (step C7).

According to the fourth embodiment, when the correction coefficient is larger than the predetermined value, the values of the corresponding conditions are stored before correction processing. In addition to the effects of the first to third embodiments, therefore, factors for variations in the correction coefficient and the soundness of the correction coefficient can be independently evaluated.

(Fifth Embodiment)

The fifth embodiment will be described next.

In the fifth embodiment, the data processing section 8 in the second embodiment further includes the function of storing conditions before correction processing when the dust radioactivity concentration is larger than a predetermined value. Note that a detailed description of portions common to the above embodiments will be omitted. The differences between the above embodiments and the fifth embodiments will be mainly described below.

FIG. 14 is a flow chart showing the process performed in a data processing section 8 in the fifth embodiment.

Note that the processing (natural nuclide measurement, a read of conditions, classification of the conditions, and storage of correction parameters) in the natural nuclide measurement mode is the same as that in steps B1 to B4 in FIG. 11 in the second embodiment, and hence a description thereof will be omitted.

In the dust radioactivity concentration measurement mode, the α ray measurement value and β ray measurement value of a measurement target are measured, and the values of conditions x1, x2, . . . are read (step D1). Correction processing is not performed immediately after this step, but the following processing is performed before the correction processing.

The correction coefficient K(x1, x2, . . . ) is calculated on the basis of the values of the conditions x1, x2, . . . , and the dust radioactivity concentration (before correction) is also calculated (step D2). It is then checked whether the value of this dust radioactivity concentration is larger than a predetermined warning reference value (step D3). If it is determined that the radioactivity concentration is higher than the warning reference value, the values of the conditions x1, x2, . . . associated with the correction coefficient are stored (step D4). If the radioactivity concentration is lower than the warning reference value, no storage operation is performed.

Subsequently, as in the second embodiment described above, a β ray value free from the influences of natural nuclides is obtained in the correction processing (step D5). Contamination determination is performed by comparing the β ray value obtained by the above processing with the predetermined warning reference value (step D6). If it is determined that contamination has occurred, a warning is generated (step D7).

According to the fifth embodiment, when the value of the dust radioactivity concentration is larger than the predetermined value, the values of the corresponding conditions are stored before correction processing. In addition to the effects of the first to third embodiments, therefore, factors for variations in the correction coefficient and the soundness of the correction coefficient can be independently evaluated.

(Sixth Embodiment)

The sixth embodiment will be described next.

In the sixth embodiment, modifications of the α ray detection section 4 and β ray detection section 5 in the first embodiment will be described. Note that a detailed description of portions common to the first embodiment will be omitted. The differences between the first and sixth embodiments will be mainly described below.

Figure 15:
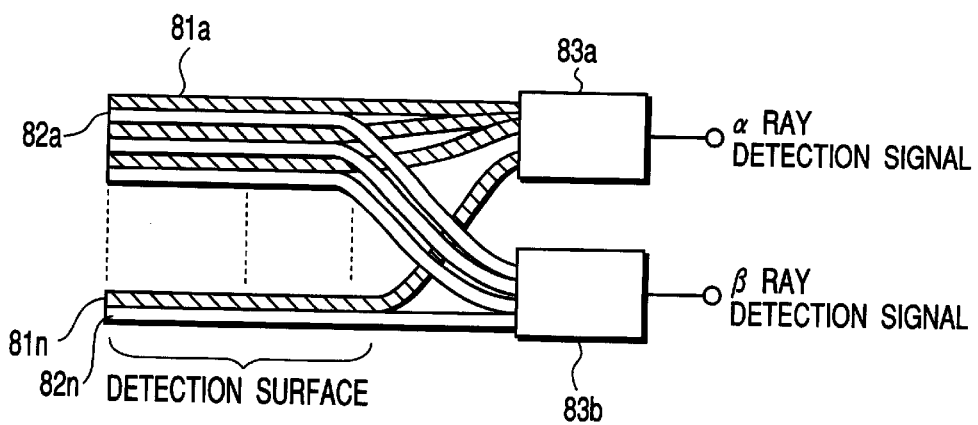
FIG. 15 is a schematic view showing an example of the arrangement of α and β ray detection sections used in a dust radiation monitor apparatus according to the sixth embodiment of the present invention.

FIG. 15 is a schematic view showing an example of the arrangement of the α ray detection section and β ray detection section used in a dust radiation monitor apparatus according to the sixth embodiment.

Referring to FIG. 15, wavelength shift fibers 81a to 81n are obtained by coating optical fibers with ZnS(Ag) and designed to detect α rays and send α ray detection signals as optical signals. Plastic scintillation fibers 82a to 82n are obtained by forming scintillation members into optical fibers, and designed to detect β rays and send β ray detection signals as optical signals.

These ZnS(Ag) wavelength shift fibers 81a to 81n and the plastic scintillation fibers 82a to 82n are alternately arranged to be flush with each other, thereby forming a detection surface. The respective optical fibers constituting the above detection surface are arranged at the same distance to the dust collection section 2 of the dust radiation monitor apparatus.

A photomultiplier 83a is connected to an end portion of each of the ZnS(Ag) wavelength shift fibers 81a to 81n. The photomultiplier 83a converts the α ray optical signal detected through each fiber into an electrical signal, and sends it to a measuring section.

According to the sixth embodiment, since the respective optical fibers independently detect α and β rays and guide the detection signals to the respective photomultipliers, the α and β rays can be independently detected without being mixed, thereby eliminating any measurement error due to mixing of the α and β rays. In addition, since the respective optical fibers are in the same plane, the problem of β ray absorption can be solved, and an improvement in detection efficiency can be attained. In addition, since a simple arrangement can be realized, the manufacturing cost can be reduced.

(Seventh Embodiment)

The seventh embodiment will be described next.

In the seventh embodiment, modifications of the α ray detection section and β ray detection section will be described.

Figure 16:
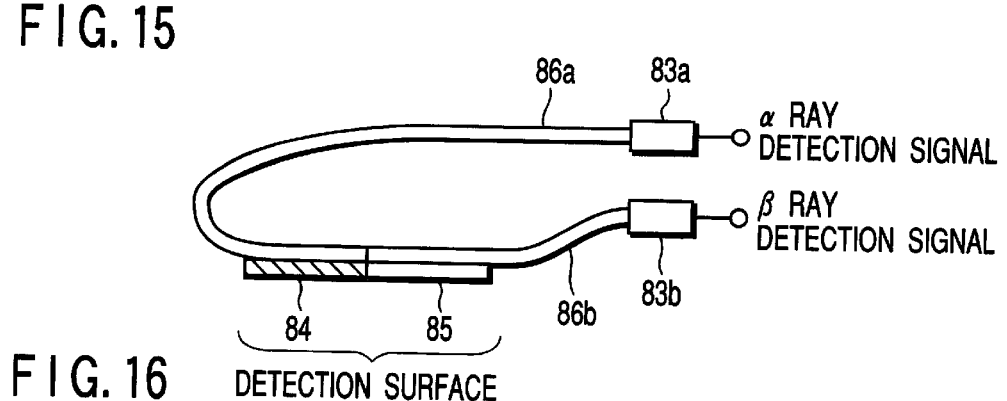
FIG. 16 is a schematic view showing an example of the arrangement of α and β ray detection section used in a dust radiation monitor apparatus according to the seventh embodiment of the present invention.

FIG. 16 is a schematic view showing an example of the arrangement of the α ray detection section and β ray detection section used in a dust radiation monitor apparatus according to the seventh embodiment.

Referring to FIG. 16, an ZnS(Ag) layer 84 is an α ray detection layer for detecting α rays. A plastic scintillator layer 85 is a β ray detection layer for detecting β rays.

The ZnS(Ag) layer 84 and the plastic scintillator layer 85 are put in the same plane to form a detection surface. The respective detection layers constituting the detection surface are arranged such that the optical fibers are located at the same distance to a dust collection section 2 of the dust radiation monitor apparatus.

One end of a wavelength shift fiber 86a is connected to the ZnS(Ag) layer 84 to send the α ray detection signal detected by the ZnS(Ag) layer 84 as an optical signal. A photomultiplier 83a is connected to the other end of the wavelength shift fiber 86a to convert the sent α ray optical signal into an electrical signal and send it to a measuring section.

One end of a wavelength shift fiber 86b is connected to the plastic scintillator layer 85 to send the β ray detection signal detected by the plastic scintillator layer 85 as an optical signal. A photomultiplier 83b is connected to the other end of the wavelength shift fiber 86b to convert the sent β ray optical signal into an electrical signal and send it to a measuring section.

In the seventh embodiment, the same effects as those of the sixth embodiment can be obtained.

(Eighth Embodiment)

The eighth embodiment will be described next.

In the eighth embodiment, modifications of the α ray detection section and β ray detection section will be described.

Figure 17:
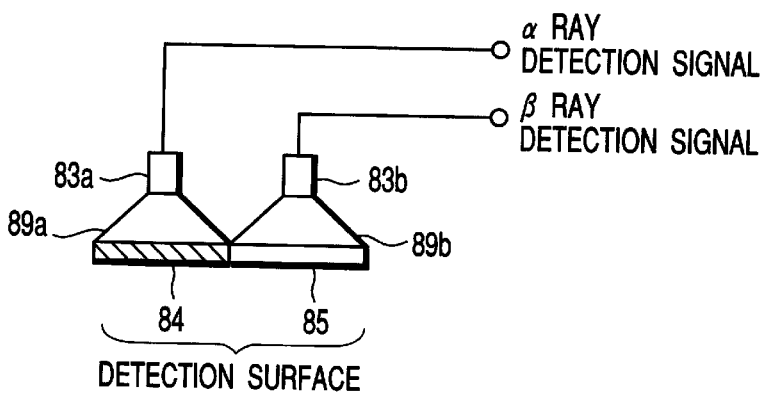
FIG. 17 is a schematic view showing an example of the arrangement of α and β ray detection sections used in a dust radiation monitor apparatus according to the eighth embodiment of the present invention.

FIG. 17 is a schematic view showing an example of the arrangement of the α ray detection section and β ray detection section used in a dust radiation monitor apparatus of the eighth embodiment.

Referring to FIG. 17, a ZnS(Ag) layer 84 is an α ray detection layer for detecting α rays. A plastic scintillator layer 85 is a β ray detection layer for detecting β rays.

The ZnS(Ag) layer 84 and the plastic scintillator layer 85 are placed in the same plane to form a detection surface. The respective detection layers constituting the detection surface are arranged such that the optical fibers are located at the same distance to a dust collection section 2 of the dust radiation monitor apparatus.

A light guide 89a covers the ZnS(Ag) layer 84 to guide the α ray detection signals detected by the entire surface of the ZnS(Ag) layer 84 to one point. A photomultiplier 83a converts the α ray detection signal guided by the light guide 89a into an electrical signal and sends it to a measuring section.

A light guide 89b covers the plastic scintillator layer 85 to guide the β ray detection signals detected by the entire surface of the plastic scintillator layer 85 to one point. A photomultiplier 83b converts the β ray signal guided by the light guide 89b into an electrical signal and sends it to a measuring section.

In the eighth embodiment, the same effects as those of the sixth embodiment can be obtained.

(Ninth Embodiment)

The ninth embodiment will be described next.

In the ninth embodiment, modifications of the α ray detection section and β ray detection section will be described.

Figure 18:
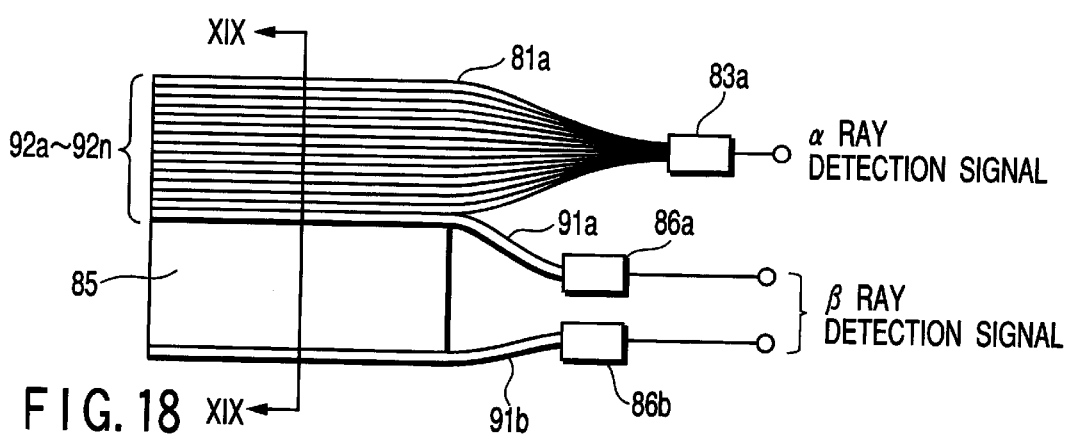
FIG. 18 is a schematic view showing an example of the arrangement of α and β ray detection sections used in a dust radiation monitor apparatus according to the ninth embodiment of the present invention.
Figure 19:
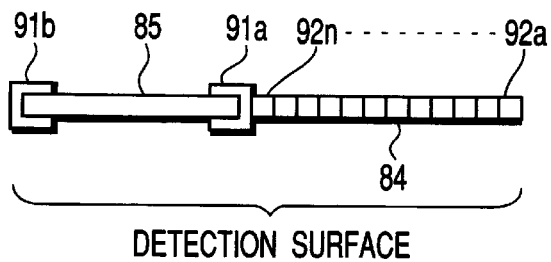
FIG. 19 is a sectional view taken along a line XIX—XIX of a detection surface in FIG. 18.

FIG. 18 is a schematic view showing an example of the arrangement of the α ray detection section and β ray detection section used in a dust radiation monitor apparatus according to the ninth embodiment. FIG. 19 is a sectional view taken along a line XIX—XIX on the detection surface in FIG. 18.

Referring to FIGS. 18 and 19, ZnS(Ag) wavelength shift fibers 92a to 92n are obtained by coating optical fibers with ZnS(Ag) and designed to detect α rays and send α ray detection signals as optical signals. A plastic scintillator layer 85 detects β rays and sends β ray detection signals as optical signals. Plastic scintillation wavelength shift fibers 91a and 91b send the β rays detected by the plastic scintillator layer 85 as optical signals.

The ZnS(Ag) wavelength shift fibers 92a to 92n and the plastic scintillator layer 85 are arranged in the same plane to form a detection surface.

A photomultiplier 83a is connected to an end portion of each of ZnS(Ag) wavelength shift fibers 81a to 81n to convert the α ray optical signal detected by each fiber into an electrical signal and send it to a measuring section. Photomultipliers 86a and 86b are respectively connected to the end portions of the wavelength shift fibers 91a and 91b to convert the β ray optical signal detected by the fibers into electrical signals and send them to a measuring section.

In the ninth embodiment as well, the same effects as those of the sixth embodiment can be obtained.

(10th Embodiment)

The 10th embodiment will be described next.

In the 10th embodiment, a modification of the detection surface in the ninth embodiment will be described. Note that a detailed description of portions common to the ninth embodiment will be omitted. The differences between the ninth and 10th embodiments will be mainly described below.

Figure 20:
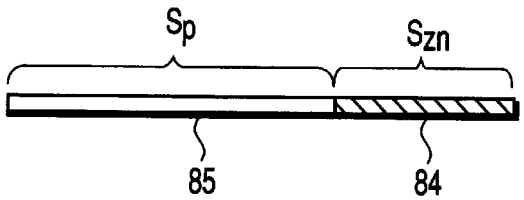
FIG. 20 is a sectional view of a detection surface in the 10th embodiment.

FIG. 20 is a sectional view of the detection surface in the 10th embodiment. As shown in FIG. 20, the detection source of a plastic scintillator layer 85 is larger in area than that of a ZnS(Ag) layer 84. This is because β rays must be detected with high sensitivity as compared with α rays. That is, this embodiment exploits the fact that the detection sensitivity increases with increasing area of the detection surface.

In addition to the effects of the ninth embodiment, the 10th embodiment has the effect of optimizing the balance between the α ray detection sensitivity and the β ray detection sensitivity.

(11th Embodiment)

The 11th embodiment will be described next.

In the 11th embodiment, modifications of the α ray detection section 4 and β ray detection section 5 in the first embodiment will be described. Note that a detailed description of portions common to the first embodiment will be omitted. The differences between the first and 11th embodiments will be mainly described below.

Figure 21:
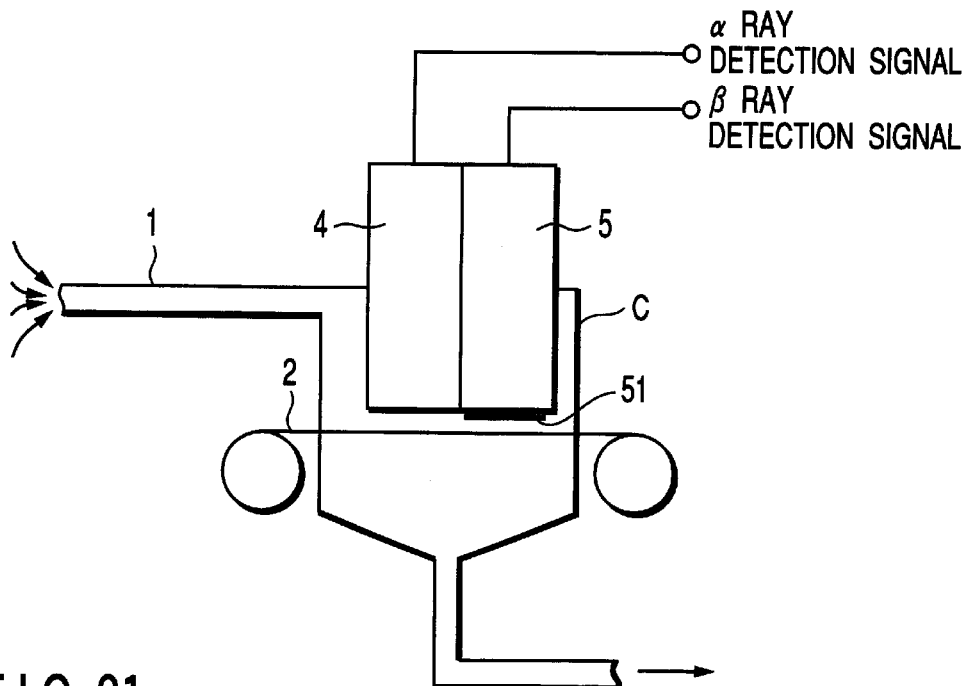
FIG. 21 is a schematic view showing an example of the arrangement of a dust radiation monitor apparatus according to the 11th embodiment of the present invention.
Figure 22:
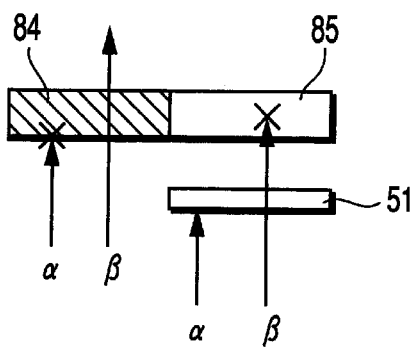
FIG. 22 is a view for explaining an α ray cut filter used in the dust radiation monitor apparatus in FIG. 21.

FIG. 21 is a schematic view showing an example of the arrangement of a dust radiation monitor apparatus according to the 11th embodiment. FIG. 22 is a view for explaining an α ray cut filter used in the dust radiation monitor apparatus in FIG. 21.

Referring to FIGS. 21 and 22, the detection surface of the α ray detection section 4 is formed by a ZnS(Ag) layer 84, and the detection surface of the β ray detection section 5 is formed by a plastic scintillator layer 85. The ZnS(Ag) layer 84 and the plastic scintillator layer 85 are in the same plane. In addition, a detachable α ray cut filter 51 is placed on the incident side of the plastic scintillator layer 85.

In this arrangement, a β ray value from which α rays are cut can be measured with a high precision by detecting β rays through the plastic scintillator layer 85 while the α ray cut filter 51 is inserted. In addition, an α ray value can be measured with a high precision from the difference between the β ray detection value obtained when the α ray cut filter 51 is inserted and the β ray detection value obtained when the α ray cut filter 51 is not inserted. This arithmetic operation is performed by a data processing section 8.

In addition to the effects of the first embodiment, the 11th embodiment has the effect of measuring α and β rays with a higher precision.

(12th Embodiment)

The 12th embodiment will be described next.

In the 12th embodiment, a modification of the α ray cut filter 51 in the 11th embodiment will be described. Note that a detailed description of portions common to the 11th embodiment will be omitted. The differences between the 11th and 12th embodiments will be mainly described below.

Figure 23:
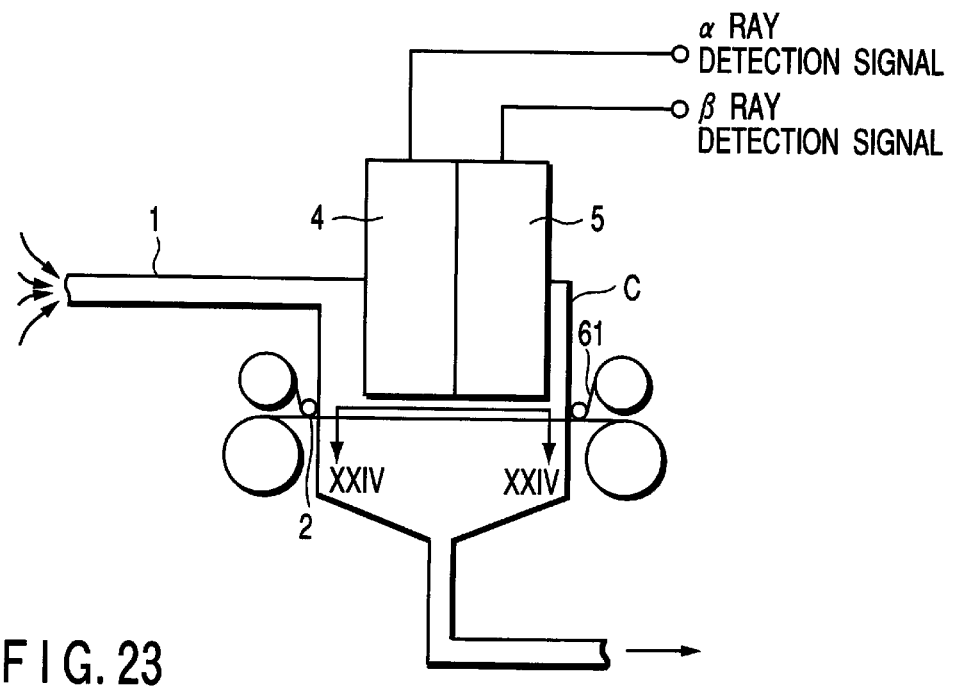
FIG. 23 is a schematic view showing an example of the arrangement of a dust radiation monitor apparatus according to the 12th embodiment of the present invention.
Figure 24:
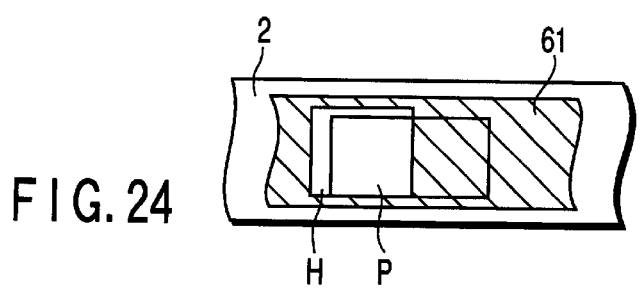
FIG. 24 is a view for explaining a movable a ray cut filter used in the dust radiation monitor apparatus in FIG. 23.

FIG. 23 is a schematic view showing an example of the arrangement of a dust radiation monitor apparatus according to the 12th embodiment. FIG. 24 is a view for explaining a movable α ray cut filter used in the dust radiation monitor apparatus in FIG. 23.

Referring to FIGS. 23 and 24, an α ray cut filter 61 having a hole H is placed between a dust collection section 2 and the detection surface constituted by a znS(Ag) layer 84 and a plastic scintillator layer 85. This α ray cut filter 61 can be moved by a driving means, so that the position of the hole H with respect to a dust collection pattern P can be moved to a desired position.

In addition to the effects of the 11th embodiment, the 12th embodiment has the effect of facilitating the attaching/detaching operation of the α ray cut filter 61 and allowing smooth α ray detection with a high precision.

(13th Embodiment)

The 13th embodiment will be described next.

In the 13th embodiment, modifications of the α ray detection section 4 and β ray detection section 5 in the first embodiment will be described. Note that a detailed description of portions common to the first embodiment will be omitted. The differences between the first and 13th embodiments will be mainly described below.

Figure 25:
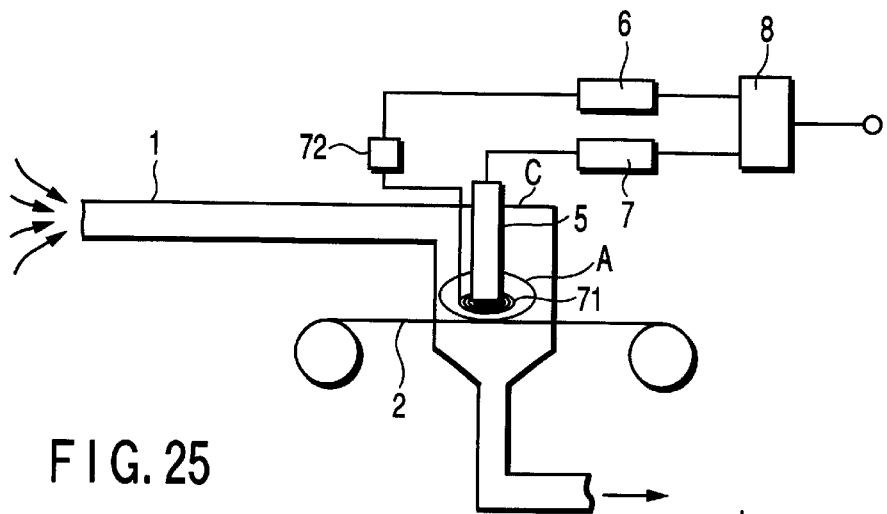
FIG. 25 is a schematic view showing an example of the arrangement of a dust radiation monitor apparatus according to the 13th embodiment of the present invention.
Figure 26:
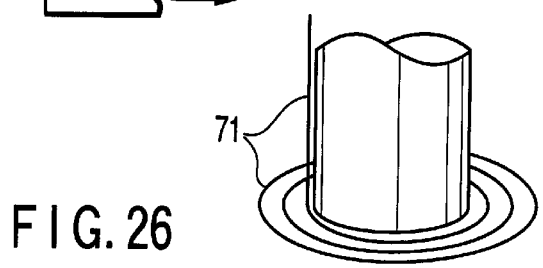
FIG. 26 is a view for explaining the arrangement of a wavelength shift fiber used in the dust radiation monitor apparatus in FIG. 25.

FIG. 25 is a schematic view showing an example of the arrangement of a dust radiation monitor apparatus according to the 13th embodiment. FIG. 26 is a view for explaining the arrangement of a wavelength shift fiber used in the dust radiation monitor apparatus in FIG. 25.

As shown in FIG. 26, at a portion A in FIG. 25, an α ray detection layer is formed by a wavelength shift fiber 71 coated with ZnS(Ag) to surround the peripheral portion of the detection layer of a β ray detection section 5. The wavelength shift fiber 71 is connected to a photomultiplier 72 through the inner wall of a sampling pipe 1. The photomultiplier 72 converts an α ray detection signal from the wavelength shift fiber 71 into an electrical signal and sends it to a measuring section 6.

According to the 13th embodiment, in addition to the effects of the 11th embodiment, since the area of the α ray detection surface can be reduced, and the area of the β ray detection surface can be increased, β rays can be measured with a higher sensitivity and precision.

As described above, in the dust radiation monitor apparatus of the present invention, which has been described with reference to the first to 13th embodiment, since α and β rays are independently detected and measured without mixing rays of light from the α and β ray detection layers, any measurement error due to mixing of the rays can be eliminated.

In addition, since the respective detection layers are flush with each other, β rays can be detected without posing any problem associated with β ray absorption by another detection layer. Therefore, the detection efficiency of low-energy β rays can be improved, and any measurement error arising from β ray absorption can be eliminated.

Furthermore, the precision of contamination determination can be further improved by using a technique of accurately obtaining a β ray value free from the influences of natural nuclides.

In the first to 13th embodiments described above, the techniques of solving the problems associated with a decrease in detection efficiency and measurement errors have been described. In the 14th to 24th embodiments below, techniques of solving the problems posed in intermittent measurement and continuous measurement will be described.

(14th Embodiment)

FIG. 27 is a schematic view showing an example of the arrangement of a dust radiation monitor apparatus according to the 14th embodiment.

As shown in FIG. 27, the dust radiation monitor apparatus of this embodiment is constituted by a pipe switching unit 101, a continuous dust radiation monitor 102, an intermittent dust radiation monitor 103, a pump 104, and a data processing section 105.

The pipe switching unit 101 switches connections between the radiation monitor side and a plurality of (n) sampling pipes 106 installed in different sampling places in radiation source handling facilities to introduce the air from each sampling place.

The continuous dust radiation monitor 102 collects dust in the air introduced through the fixed sampling pipe 106 switched by the pipe switching unit 101 into a dust collection section, and measures the radioactivity concentration of the dust by using the radiation reading from the dust in the dust collection section.

The intermittent dust radiation monitor 103 collects dust in the air introduced through each of the sampling pipes 106 that are sequentially switched by the pipe switching unit 101 into the dust collection section, and measures the radioactivity concentration of the dust by using the radiation reading from the dust in the dust collection section.

In this case, each of the continuous dust radiation monitor 102 and intermittent dust radiation monitor 103 is constituted by filter paper 108 for collecting dust in the air, a filter paper driving section 111 for driving the filter paper 108, a radiation detector 109 for detecting radiation from the dust collected on the filter paper 108, and a flow rate transmitter 110 serving as a flow rate measuring means for measuring the flow rate of air introduced through the sampling pipe 106 switched by the pipe switching unit 101 and transmitting the corresponding information to an external unit.

The pump 104 draws the air from the sampling pipe 106 into the pipe system including the dust collection section of each of the continuous dust radiation monitor 102 and intermittent dust radiation monitor 103.

That is, the pump 104 is designed as a single pump having the drawing/dust collecting function in each of the continuous dust radiation monitor 102 and intermittent dust radiation monitor 103.

The data processing section 105 calculates/records/displays the radioactivity concentration of dust on the basis of the radiation output from the radiation detector 109, the flow rate from the flow rate transmitter 110, and a correction coefficient. The data processing section 105 also controls the pipe switching unit 101 and the filter paper driving section 111 in accordance with the calculation result.

When the intermittent dust radiation monitor 103 detects that the radioactivity concentration of dust is higher than a predetermined value, the data processing section 105 outputs control commands to the pipe switching unit 101 and the filter paper driving section 111 to switch the connection of the sampling pipe 106 through which the dust is introduced from the intermittent dust radiation monitor 103 to the continuous dust radiation monitor 102.

The data processing section 105 also has the function of correcting the measured radioactivity concentration of the dust in accordance with the value of the flow rate from the flow rate transmitter 110.

The data processing section 105 further includes the function of calculating the detection limit value for each measurement of radioactivity concentration, and prolonging the dust collection time as compared with the normal time to set the radiation reading to a value larger than the detection limit value when the radiation reading is equal to or less than the detection limit value.

Reference numeral 107 denotes a sampler inlet.

The operation of the dust radiation monitor apparatus according to this embodiment having the above arrangement will be described next.

Referring to FIG. 27, the sampling pipes 106 are sequentially switched by the pipe switching unit 101, and dust is collected by the intermittent dust radiation monitor 103.

In this case, the filter paper 108 is moved by the filter paper driving section 111, and the air is drawn by the pump 104 while the filter paper 108 is at a standstill, thereby collecting dust on the filter paper 108.

Meanwhile, the sampling pipes other than the pipe subjected to measurement in the intermittent dust radiation monitor 103 are arbitrarily selected and connected to the continuous dust radiation monitor 102 by the pipe switching unit 101, thereby continuously collecting dust and performing measurement.

Note that the functions of the continuous dust radiation monitor 102 and intermittent dust radiation monitor 103 can be switched by changing the controlled variables of the movement of the filter paper 108 and dust collection time in the data processing section 105.

When the intermittent dust radiation monitor 103 detects that the radioactivity concentration of collected dust is higher than a predetermined value, the data processing section 105 controls the pipe switching unit 101 to switch the connection of the sampling pipe 106 from the intermittent dust radiation monitor 103 to the continuous dust radiation monitor 102, thereby switching from intermittent measurement to continuous measurement.

Figure 28:
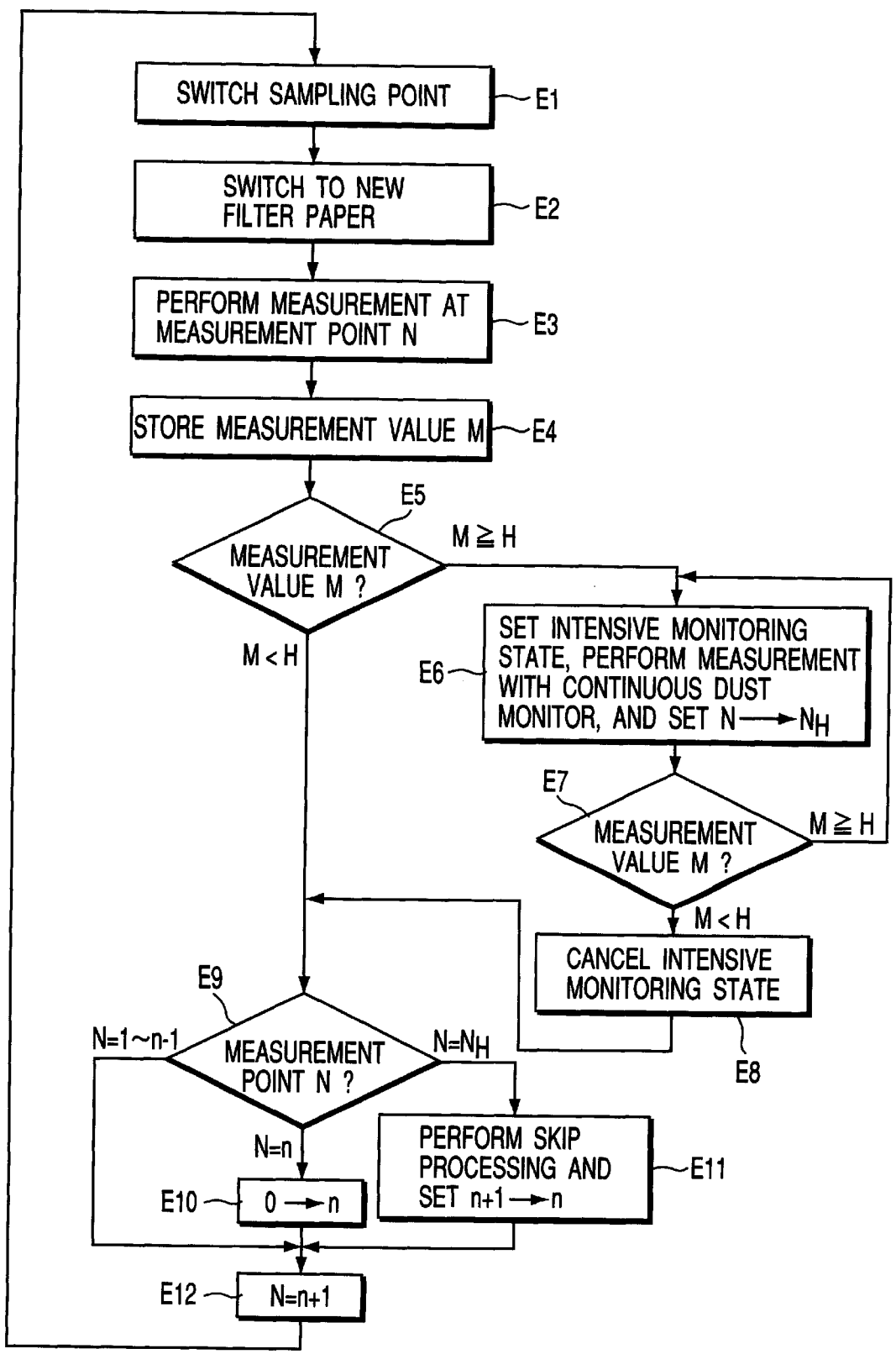
FIG. 28 is a flow chart showing the operation of the dust radiation monitor apparatus according to the 14th embodiment.

FIG. 28 is a flow chart showing a detailed procedure for the above operation.

When the sampling point (measurement point or channel) is switched (step E1), the currently used filter paper is switched to new filter paper accordingly (step E2). Measurement is performed at a measurement point N (step E3), and a measurement value M is stored (step E4).

It is then checked whether the measurement value M is equal to or more than a predetermined threshold H (step E5). If it is determined that the measurement value M is equal to or more than the predetermined threshold H, an intensive monitoring state is set for the measurement point N, and the sampling pipe 106 is connected to the continuous dust radiation monitor 102. $N_H$ is then set in the measurement point N (step E6). If the measurement value M becomes smaller than the threshold H (step E7), the intensive monitoring state is canceled (step E8).

If it is determined in step E5 that the measurement value M is smaller than the predetermined threshold H, the value at the measurement point N is determined without shifting to the intensive monitoring state (i.e., without changing the normal intermittent operation) (step E9). If N=1 to n−1, since this indicates that measurement has not been completed up to the last measurement point n, the value is not changed. If N=n, since this indicates that a measurement process has been completed, the value n is set to 0 (step E10). If $N=N_H$ (the measurement point subjected to intensive monitoring), n+1 is set in the value n to perform skip processing (step E11). After the value n is incremented by one (step E12), the flow returns to step E1.

In the above operation, measurement is normally performed by the intermittent dust radiation monitor 103 while the measurement points corresponding to channels 1 to n are switched. When there is a channel that exhibits a measurement value equal to or more than a predetermined threshold, this channel is connected to the continuous dust radiation monitor 102 to perform continues measurement. Subsequently, continuous measurement for the channel continues until the measurement value becomes smaller than the threshold. Meanwhile, the intermittent dust radiation monitor 103, which is performing intermittent measurement, bypasses (skips) the channel.

With this operation, a sampling place of interest can be intensively monitored.

In addition, in this apparatus, since the radioactivity concentration of dust is calculated on the basis of the correction coefficient set in consideration of the elapsed time from the start of dust collection and the flow rate value from the flow rate transmitter 110, a flow rate control valve 1405, which is required in the prior art, can be omitted. Even if, therefore, the flow rate varies, the radioactivity concentration of dust can be accurately calculated by correcting it.

More specifically, since the flow rate is used as a parameter in calculating the radioactivity concentration of dust and proportional to the radioactivity concentration, the radioactivity concentration is multiplied by the ratio of the flow rate to the reference flow rate to be corrected (e.g., if the flow rate becomes lower than the reference flow rate by 10%, the corresponding ratio is multiplied).

Every time a radioactivity concentration is measured, a detection limit value is calculated by the data processing section 105. When the counted value of radiation from the radiation detector 109 is equal to or smaller than the detection limit value, the pipe switching unit 101 and the filter paper driving section 111 are controlled to delay the stop time of the filter paper 108 so as to extend the dust collection time. With this operation, the radiation reading from the radiation detector 109 can be set to a value larger than the detection limit value.

As described above, in the dust radiation monitor apparatus of this embodiment, while measurement is normally performed by the intermittent dust radiation monitor 103 as in the prior art, the measurement is switched to the measurement by the continuous dust radiation monitor 102, as needed, thereby continuously performing monitoring operation. This improves the measurement precision.

In addition, switching between the continuous dust radiation monitor 102 and the intermittent dust radiation monitor 103 is performed by switching the dust collection sections including the filter paper driving sections 111 in accordance with control commands. This allows the two monitors to have the same device arrangement and share the components, unlike the prior art using them as dedicated devices.

Furthermore, if measurement by the intermittent dust radiation monitor 103 is automatically switched to measurement by the continuous dust radiation monitor 102 when it is detected that the radioactivity concentration of collected dust is higher than a predetermined value, an improvement in measurement precision and labor saving can be attained.

When the radioactivity concentration of dust measured by each of the continuous and intermittent dust radiation monitors 102 and 103 is corrected in accordance with the flow rate of air introduced through the sampling pipe 106 switched by the pipe switching unit 101, high measurement precision can be maintained with respect to even variations in flow rate.

Furthermore, every time the radioactivity concentration is measured, the detection limit value is calculated. When the counted value of radiation is equal to or less than the detection limit value, the dust collection time is set to be longer than the normal dust collection time to make the radiation reading larger than the detection limit value. This can attain an improvement in measurement precision and labor saving.

Moreover, since dust is drawn and collected from both the continuous and intermittent dust radiation monitors 102 and 103 by using the single pump 104, the single pump 104 is shared among the dust radiation monitors 102 and 103. This allows a reduction in cost and simplifies the arrangement.

(15th Embodiment)

FIGS. 29 and 30 are schematic views each showing an example of the arrangement of a pipe switching unit 101 in a dust radiation monitor apparatus in this embodiment. The same reference numerals in FIGS. 29 and 30 denote the same parts as in FIG. 27.

As shown in FIGS. 29 and 30, the pipe switching unit 101 in the dust radiation monitor apparatus of this embodiment is constituted by a plurality of (n) three-way valves 201 to 20n, each having the function of connecting the pipe to one of an intermittent dust radiation monitor 103 and a continuous dust radiation monitor 102 while closing the pipe to the other radiation monitor.

FIG. 29 shows a case wherein sampling pipes 106 are switched by only the intermittent dust radiation monitor 103 to perform measurement while no pipe is connected to the continuous dust radiation monitor 102.

FIG. 30 shows a case wherein one (No. 1) of the sampling pipes 106 is connected to the continuous dust radiation monitor 102, while one (No. 2) of the remaining sampling pipes 106 is connected to the intermittent dust radiation monitor 103, and measurement is performed while the sampling pipes 106 are switched.

In this case, even if the intermittent dust radiation monitor 103 and the continuous dust radiation monitor 102 are interchanged, the function of this structure remains unchanged.

As described above, in the dust radiation monitor apparatus of this embodiment, since the pipe switching unit 101 is constituted by the three-way valves 201 to 20n, the arrangement of the apparatus can be simplified.

(16th Embodiment)

FIGS. 31 and 32 are schematic views each showing an example of the arrangement of a pipe switching unit 101 in a dust radiation monitor apparatus according to this embodiment. The same reference numerals in FIGS. 31 and 32 denote the same parts as in FIGS. 27 to 30.

As shown in FIGS. 31 and 32, in the pipe switching unit 101 in the dust radiation monitor apparatus of this embodiment, the three-way valves 201 to 20n in FIGS. 29 and 30 are replaced with combinations of solenoid valves 402 and 403 as one-way valves and a rotating valve 401 that moves to a sampling pipe 106 to be connected.

FIG. 31 shows a case wherein only the solenoid valve 402 of one (No. 1) of the sampling pipes 106 is opened to connect the pipe to an intermittent dust radiation monitor 103 so as to collect dust and perform measurement, while the rotating valve 401 moves to the connection portion of the sampling pipe 106 other than the one selected by the solenoid valve 402 to connect the pipe to the continuous dust radiation monitor 102 so as to collect dust and perform measurement.

FIG. 32 shows a case wherein the solenoid valves 402 and 403 and the rotating valve 401 are switched to connect the other sampling pipe 106 to collect dust and perform measurement.

In this case, even if the intermittent dust radiation monitor 103 and the continuous dust radiation monitor 102 are interchanged, the function of this structure remains unchanged.

As described above, according to the dust radiation monitor apparatus of this embodiment, since the pipe switching unit 101 is constituted by the solenoid valves 402 and 403, which are one-way valves, and the rotating valve 401, the arrangement can be made simpler than that of the 15th embodiment.

(17th Embodiment)

FIG. 33 is a schematic view showing an example of the arrangement of a pipe switching unit 101 of a dust radiation monitor apparatus according to this embodiment.

As shown in FIG. 33, in the pipe switching unit 101 of the dust radiation monitor apparatus of this embodiment, the three-way valves 201 to 20n in FIGS. 29 and 30 are replaced with combinations of two rotating valves 601 and 603 that move to sampling pipes 106 so as to connect them.

FIG. 33 shows a case wherein dust collection and measurement are performed by using the rotating valve 601 that moves to one of the sampling pipes 106 to connect it to an intermittent dust radiation monitor 103 while connecting another sampling pipe 106 to a through pipe 602, and the rotating valve 603 that moves to part of a joint portion to the through pipe 602 to connect the sampling pipe 106 to a continuous dust radiation monitor 102.

In this case, even if the intermittent dust radiation monitor 103 and the continuous dust radiation monitor 102 are interchanged, the function of this structure remains unchanged.

As described above, in the dust radiation monitor apparatus of this embodiment, since the pipe switching unit 101 is constituted by the two rotating valves 601 and 603, the arrangement can be further simplified as compared with the 16th embodiment.

(18th Embodiment)

A dust radiation monitor apparatus according to this embodiment further includes the function of storing the radioactivity concentration of dust measured by the data processing section 105 in FIG. 27 and outputting the stored data in units of radioactivity concentration measurement points (in units of sampling places).

In the prior art, as shown in FIG. 35, radioactivity concentrations are output in graphical form in the switching order of the sampling pipes. In this case, since the data are simply output in the switching order of the sampling pipes, it is difficult to discriminate a shift from one sampling place to the next sampling place.

In contrast to this, according to the dust radiation monitor apparatus of this embodiment, the measured radioactivity concentrations are stored in a data processing section 105, and a graph indicating shifts in radioactivity concentration at the respective measurement points can be output as shown in FIG. 36 in accordance with the flow chart of FIG. 34.

The flow of processing in FIG. 34 will be described below.

Upon measurement at a given measurement point (step F1), the data processing section 105 stores the measurement data (step F2). The data processing section 105 then discriminates No. of the measurement point (step F3). If this measurement point is one of measurement points 1 to n as measurement targets, the data processing section 105 sets a color corresponding to the corresponding channel (step F4), and connects the previous measurement value to the current measurement value on the graph by using the set color (step F5).

As described above, according to the dust radiation monitor apparatus of this embodiment, the measured radioactivity concentrations of dust are stored, and the stored data are output in units of radioactivity concentration measurement points, thereby providing data that allows easy discrimination of shifts.

(19th Embodiment)

FIG. 37 is a schematic view showing an example of the arrangement for the installation of pumps in a dust radiation monitor apparatus of this embodiment. The same reference numerals in FIG. 37 denote the same parts as in FIG. 27.

In the dust radiation monitor apparatus of this embodiment, as shown in FIG. 37, pumps 104 and 1203 are respectively provided for the continuous dust radiation monitor 102 and the intermittent dust radiation monitor 103 in FIG. 27, and a bypass pipe 1205 having a bypass valve 1204 is installed between the inlets of the two pumps 104 and 1203 through stop valves 1201 and 1202.

In the dust radiation monitor apparatus having this arrangement, when, for example, the pump 104 fails, the stop valve 1201 of the faulty pump 104 is closed, and the stop valves 1202 and 1204 are opened to draw and collect dust by using the other pump 1203.

In this case, although the flow rate decreases, measurement can be continued while the high precision is maintained by performing concentration correction in accordance with the flow rate in the above manner.

As described above, in the dust radiation monitor apparatus of this embodiment, since the bypass pipe 1205 having the bypass valve 1204 is installed between the inlets of the two pumps 104 and 1203 through the stop valves 1201 and 1204, when one pump fails, the stop valves are opened to draw and collect dust by using the other pump, thereby continuing the measurement.

In addition, even if the flow rate drops, high precision can be maintained by performing concentration correction in accordance with the flow rate.

(20th Embodiment)

FIG. 38 is a schematic view showing an example of the arrangement for the installation of pumps in a dust radiation monitor apparatus of this embodiment. The same reference numerals in FIG. 38 denote the same parts as in FIG. 37.

In the dust radiation monitor apparatus of this embodiment, as shown in FIG. 38, the pump 104 of the two pumps 104 and 1203 in FIG. 37 is used as a pump for normal dust drawing/collecting operation, and the other pump 1203 and the stop valve 1202 are replaced with a backup pump 1302 and a stop valve 1301 which are used for backup operation to draw and collect dust when the pump 104 for normal operation stops due to a failure or the like.

In the dust radiation monitor apparatus having this arrangement, dust is drawn and collected by using one pump 104 in normal operation. When, however, the pump 104 stops due to a failure or the like, the backup pump 1302 is started to continue measurement.

In this case, a stop valve 1201 and the stop valve 1301 connected to the inlets of the pumps 104 and 1303 open in accordance with the operations of the pumps 104 and 1302.

As described above, in the dust radiation monitor apparatus of this embodiment, since one of the two pumps in the 19th embodiment is used as a backup pump, even if the pump for normal operation stops due to a failure or the like, measurement can be continued by starting the backup pump.

(21st Embodiment)

In the 14th embodiment (FIG. 27), the monitoring schemes used by the continuous dust radiation monitor 102 and the intermittent dust radiation monitor 103 are fixed. For this reason, measurement cannot be simultaneously and continuously performed at a plurality of measurement points.

In the 21st embodiment, a dust radiation monitor apparatus capable of simultaneous, continuous measurement at a plurality of measurement points will be described. The same reference numerals in this embodiment denote the same parts as in the embodiment shown in FIG. 27, and a detailed description thereof will be omitted. The differences between the 21st and 14th embodiments will be mainly described below.

Figure 39:
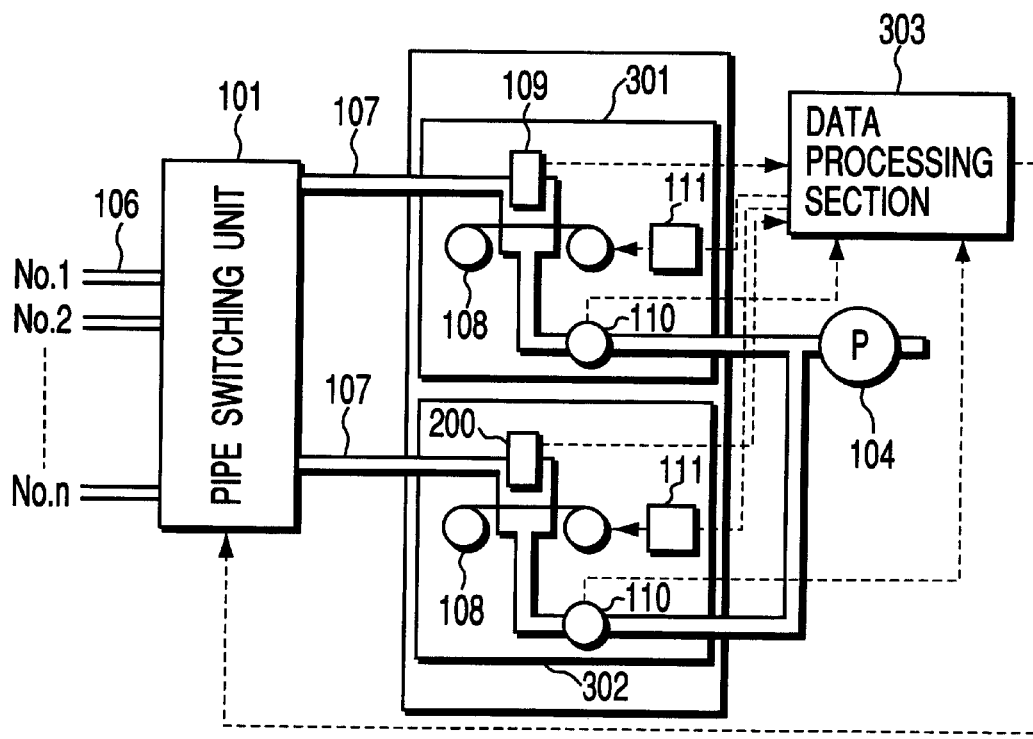
FIG. 39 is a schematic view showing an example of the arrangement of a dust radiation monitor apparatus according to the 21st embodiment of the present invention.

FIG. 39 is a schematic view showing an example of the arrangement of the dust radiation monitor apparatus of this embodiment.

Dust radiation monitors 301 and 302 can be arbitrarily switched between the continuous and intermittent schemes. Note that the dust radiation monitors 301 and 302 respectively include a β ray detector 109 and an α(β) ray detector 200. Switching to each scheme is controlled through a filter paper driving section 111 in accordance with a command from a data processing section 303. The data processing section 303 collectively performs dust collection control and measurement processing for the respective dust radiation monitors 301 and 302. The data processing section 303 switches/controls the schemes of the dust radiation monitors 301 and 302 between the continuous and intermittent schemes, in particular, in accordance with the circumstances by sending commands to the respective filter paper driving sections 111.

In normal operation, for example, the dust radiation monitor 302 operates as an intermittent monitor, and the dust radiation monitor 301 operates as a continuous monitor. When the measurement value at a given measurement point becomes equal to or more than a predetermined threshold, the dust radiation monitor 301 operating as a continuous monitor performs continuous measurement. The processing up to this step is the same as in the 14th embodiment.

Assume that while continuous measurement is performed at the above measurement point, the measurement value at another measurement point becomes equal to or more than the predetermined threshold, and continuous measurement is required at this measurement point as well. In this case, the data processing section 303 controls to switch the dust radiation monitor 302 operating as an intermittent monitor to a continuous monitor. With this control, continuous measurement can be simultaneously performed at the two measurement points at which the measurement values are equal to more than the threshold.

Figure 40:
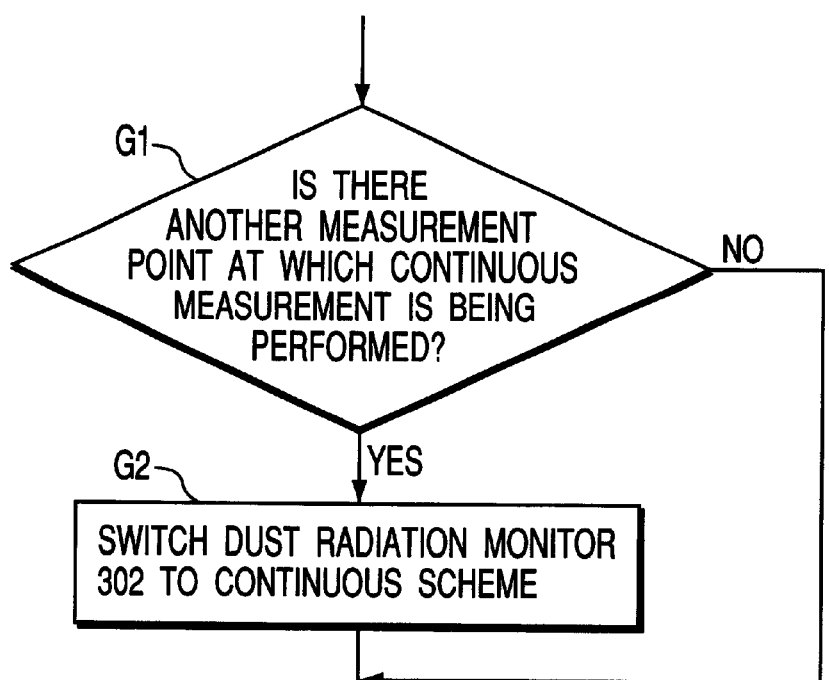
FIG. 40 is a flow chart showing part of the operation of the dust radiation monitor apparatus according to the 21st embodiment.

This operation can be implemented by inserting the processing shown in FIG. 40 before step E6 in the flow chart of FIG. 28. More specifically, when the measurement value at a given measurement point becomes equal to or more than the threshold, it is checked whether there is another point at which continuous measurement is being performed (step G1). If it is determined that such an measurement point is present, the scheme of the dust radiation monitor 302 is switched to the continuous scheme (step G2). In step E6, the intensive monitoring state is set.

According to the 21st embodiment, the schemes of the respective monitors can be changed in accordance with the circumstances, and continuous measurement can be performed at a plurality of points. In addition, since only one data processing section is used, space saving and a cost reduction can be attained.

For the sake of simplicity, this embodiment exemplifies a structure using two dust radiation monitors. However, the present invention is not limited to this, and three or more dust radiation monitors can be used. This can increase the number of measurement points at which continuous measurement can be simultaneously performed.

(22nd Embodiment)

Figure 41A:
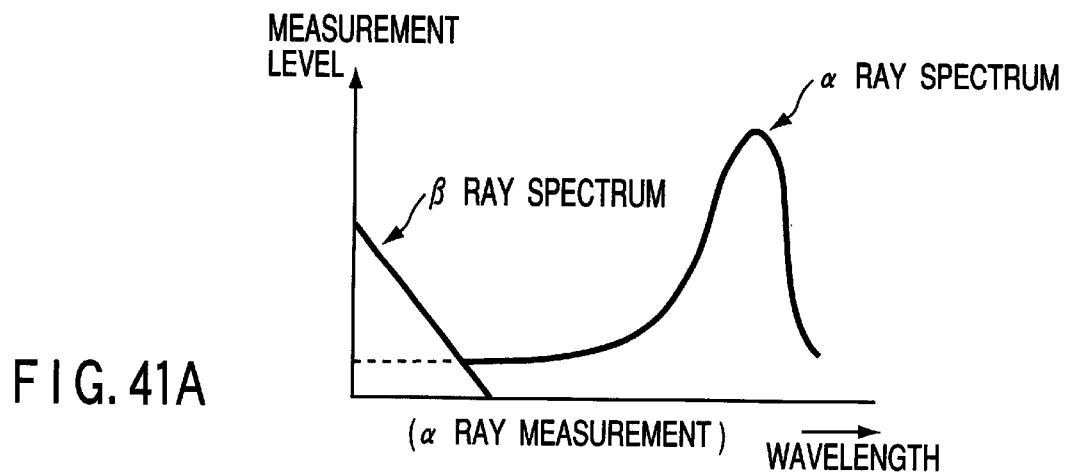
FIGS. 41A and 41B are graphs for explaining the influences of natural nuclides on normal measurement values to explain the 22nd embodiment of the present invention.
Figure 41B:
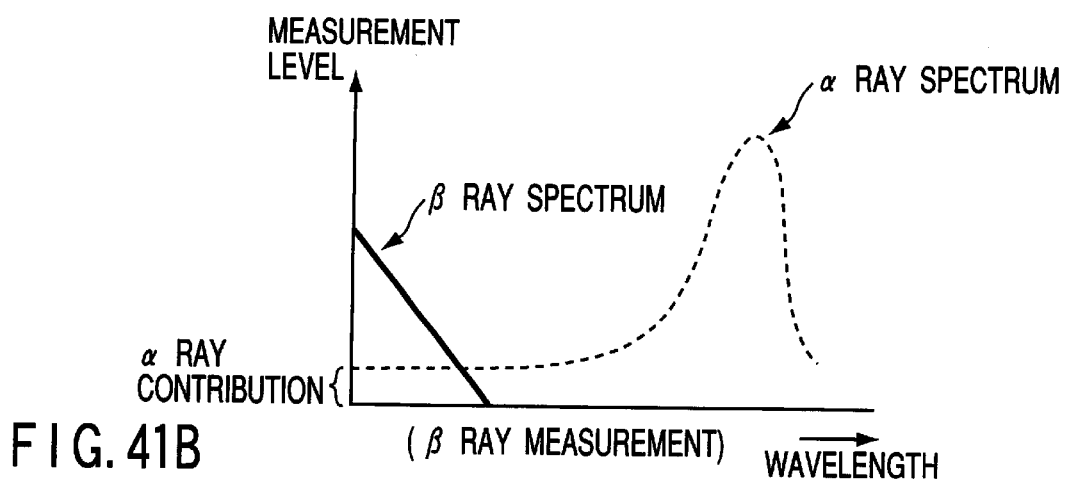

In the 21st embodiment (FIG. 39) described above, β rays can be detected by the radiation detector 109. The air contains natural nuclides (Rn and the like) existing in nature. When these nuclides are collected, they emit α and β rays which are detected as extra increments to normal measurement values (see FIGS. 41A and 41B). It is therefore difficult to check whether these extra increments correspond to dust radioactivity concentration variations caused by leakage through pipes or background level due to natural nuclides. Hence, it is difficult to obtain a β ray measurement value free from the influences of natural nuclides. In addition, since nuclide analysis must be performed on collected dust, the filter paper on which dust has collected must be unloaded from the apparatus, and analysis must be performed with a separately prepared analysis unit. This operation makes the operator feel cumbersome.

A dust radiation monitor which can easily obtain a β ray measurement value free from the influences of natural nuclides with a high precision will be described in the 22nd embodiment. The same reference numerals in the 22nd embodiment denote the same parts as in the embodiment shown in FIG. 39, and a detailed description thereof will be omitted. The differences between the 22nd and 21st embodiments will be mainly described below.

Figure 42:
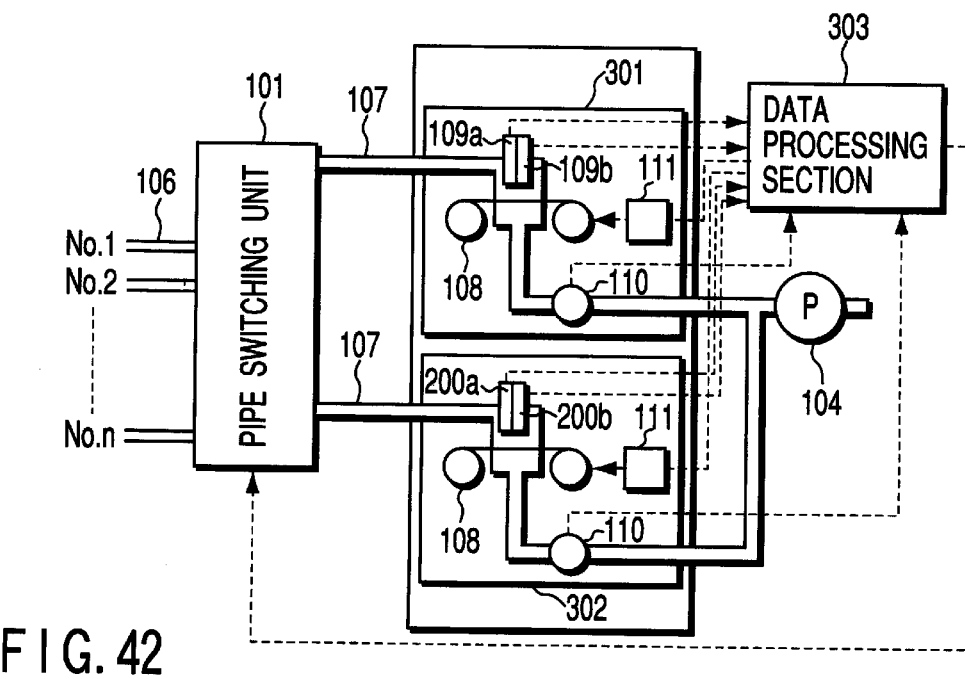
FIG. 42 is a schematic view showing an example of the arrangement of the dust radiation monitor apparatus according to the 22nd embodiment of the present invention.

FIG. 42 is a schematic view showing an example of the arrangement of the dust radiation monitor apparatus of this embodiment.

An α ray detector 109*a* and a β ray detector 109*b* are provided for a dust radiation monitor 301. The α ray detector 109 an the β ray detector 109*b* are designed to independently detect α and β rays without mixing them.

Likewise, an α ray detector 200*a* and a β ray detector 200*b* are provided for a dust radiation monitor 302. The α ray detector 200*a* and the β ray detector 200*b* are designed to independently detect α and β rays without mixing them.

With this arrangement, α and β ray measurement values can be respectively obtained from the independently detected α and β rays.

A data processing section 303 calculates using the fact that a measurement nuclide generated upon leakage emits no α ray, but a natural nuclide emit α rays in the decay process. That is, the data processing section 303 obtains the emission ratio between α and β rays emitted from natural nuclides as a correction coefficient, and multiplies the α ray measurement value by this correction coefficient to calculate the β ray value of natural nuclides. The data processing section 303 then subtracts the calculated β ray value from the β ray measurement value to obtain a β ray value free from the influences of natural nuclides.

According to the 22nd embodiment, since the data processing section 303 performs a predetermined calculation, a β ray measurement value free from the influences of natural nuclides can be easily and accurately obtained. In addition, since α and β rays can be independently detected and measured, the α and β rays do not mix with each other.

(23rd Embodiment)

In the 23rd embodiment, a dust radiation monitor apparatus capable of separately measuring α and β rays will be described. The same reference numerals in this embodiment denote the same parts as in the embodiment shown in FIG. 39, and a detailed description thereof will be omitted. The differences between the 21st and 23rd embodiments will be mainly described below.

Figure 43:
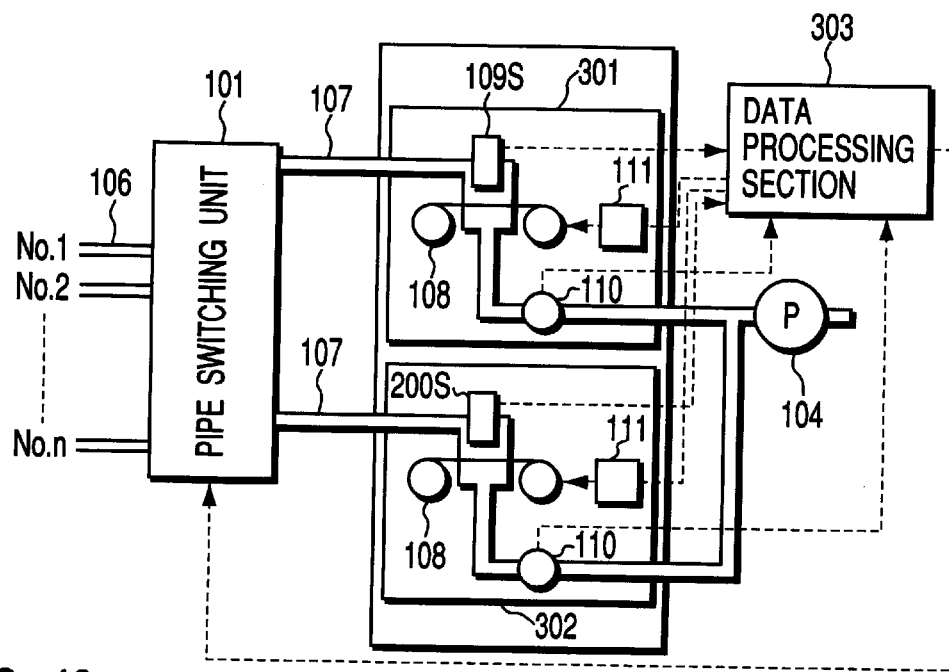
FIG. 43 is a schematic view showing an example of the arrangement of a dust radiation monitor apparatus according to the 23rd embodiment of the present invention.

FIG. 43 is a schematic view showing an example of the arrangement of the dust radiation monitor apparatus of this embodiment.

Semiconductor detectors 109s and 200s are respectively provided for dust radiation monitors 301 and 302. With this arrangement, α and β rays can be separately measured, and a reduction in the size of each detector can be attained.

(24th Embodiment)

In the 24th embodiment, a dust radiation monitor apparatus capable of simultaneously performing comprehensive monitoring/nuclide analysis of α, β, and γ rays will be described. The same reference numerals in this embodiment denote the same parts as in the embodiment shown in FIG. 39, and a detailed description thereof will be omitted. The differences between the 21st and 24th embodiments will be mainly described below.

Figure 44:
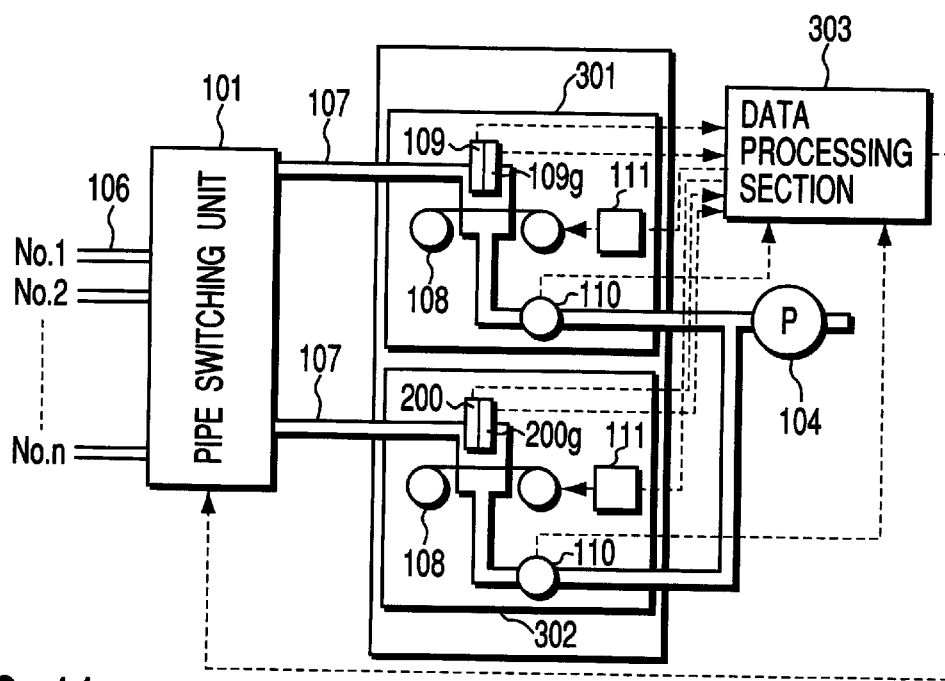
FIG. 44 is a schematic view showing an example of the arrangement of a dust radiation monitor apparatus according to the 24th embodiment of the present invention.

FIG. 44 is a schematic view showing an example of the arrangement of the dust radiation monitor apparatus of this embodiment.

In a dust radiation monitor 301, a Ge detector 109g is set on the side of a β ray detector 109. In a dust radiation monitor 302, a Ge detector 200g is set on the side of an α(β) ray detector 200. With this arrangement, comprehensive monitoring/nuclide analysis of α, β, and γ rays can be simultaneously performed.

As described above, according to the dust radiation monitor apparatus of the present invention, which has been described with reference to the 14th to 24th embodiments, while intermittent measurement is performed as in the prior art, the measurement scheme is switched to continuous measurement, as needed, thereby improving the measurement precision.

Dust sampling apparatuses used for dust radiation monitor apparatuses will be described below in the 25th to 31st embodiments.

(25th Embodiment)

Figure 45A:
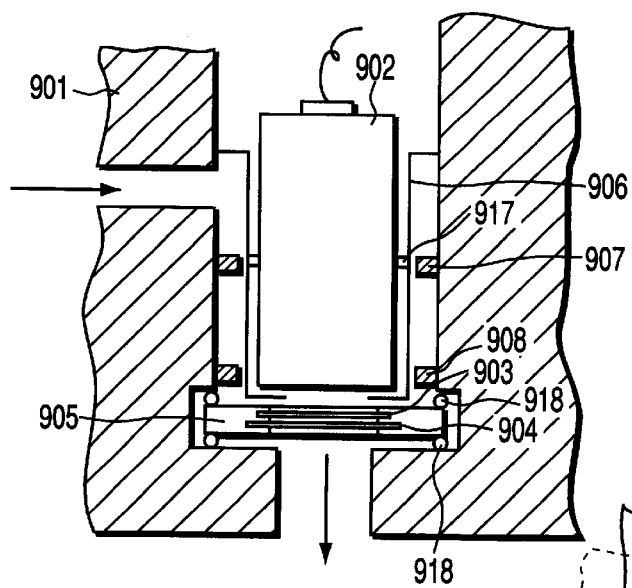
FIGS. 45A and 45B are views showing an example of the arrangement of a dust sampling apparatus according to the 25th embodiment of the present invention.
Figure 45B:
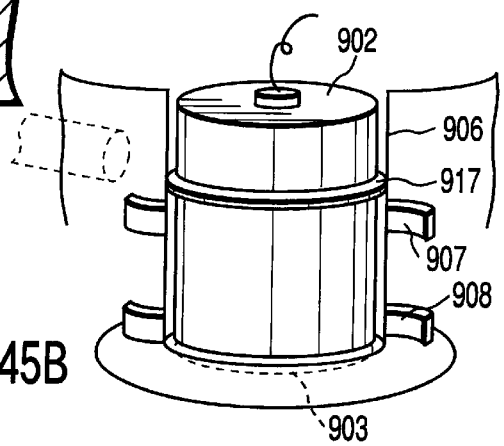

FIGS. 45A and 45B are schematic views showing an example of the arrangement of a dust sampling apparatus according to the 25th embodiment. FIG. 45A shows the overall arrangement of the dust sampling apparatus. FIG. 45B shows the main part of the apparatus.

As shown in FIGS. 45A and 45B, the dust sampling apparatus of this embodiment is constituted by a chamber 901, a radiation detector 902, filter paper 903, a paper filter receiving wire net 904, a filter paper holder 905, a detector holder 906, upper flow path agitating plates (fins) 907, lower flow path agitating plate (fins) 908, a detector O-ring 917, and a paper filter holder O-ring 918.

The chamber 901 is made of a metal such as iron or lead. The chamber 901 blocks external radiation, draws the air in a predetermined place in a radiation management area, and exhausts the air after dust capturing.

The radiation detector 902 detects radiation from captured dust and is installed in the chamber 901. The detection signal based on the radiation detected by the radiation detector 902 is sent to the outside through a cable.

The filter paper 903 is used to capture dust in the air drawn into the chamber 901. The paper filter receiving wire net 904 serves to prevent the filter paper 903 from being destroyed by the drawing pressure.

The filter paper holder 905 is mounted on the chamber 901 to hold the filter paper 903 and the paper filter receiving wire net 904.

The detector holder 906 is mounted on the chamber 901 to hold the radiation detector 902 in the center of the chamber 901.

The upper flow path agitating plates 907 are mounted on an upper portion of the chamber 901 or upper flow path agitating plate 907 to agitate the flow path of air drawn into the chamber 901. The lower flow path agitating plates 908 are mounted on a lower portion of the chamber 901 or detector holder 906 to agitate the flow path of air draw into the chamber 901.

The detector O-ring 917 prevents leakage of air through the gap between the radiation detector 902 and the detector holder 906. The paper filter holder O-ring 918 also prevent leakage of air through the gap between the filter paper holder 905 and the chamber 901.

In the dust sampling apparatus having this arrangement, when air is drawn into the chamber 901 through its inlet, the flow path of air is agitated by the upper flow path agitating plates 907 and the lower flow path agitating plates 908 to increase the degree of air turbulence. The pressure distribution of air with respect to the filter paper 903 is made uniform by the air whose flow path is agitated in this manner. With this operation, dust can be uniformly captured, and the air after dust capturing is exhausted through the outlet of the chamber 901.

As described above, according to this embodiment, since the upper flow path agitating plates 907 and the lower flow path agitating plates 908 are arranged in the air flow path inside the chamber 901, the flow path of drawn air is agitated to increase the degree of air turbulence. As a consequence, the pressure distribution of air with respect to the filter paper 903 is made uniform, and dust can be captured uniformly.

(26th embodiment)

Figure 46A:
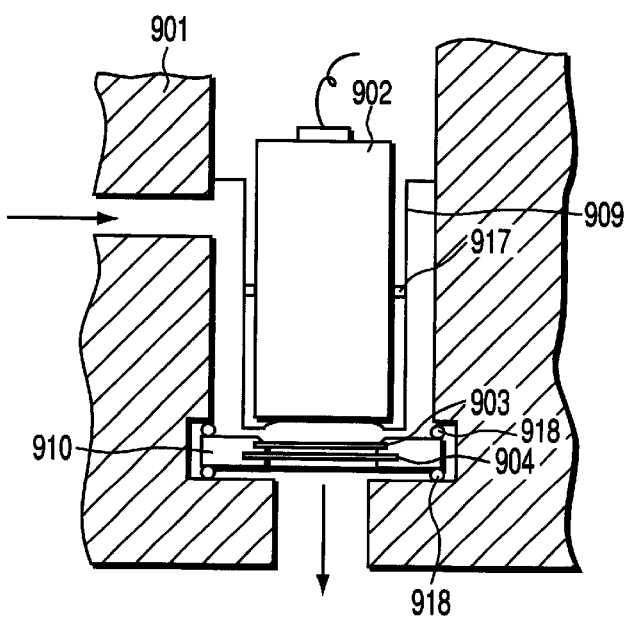
FIGS. 46A and 46B are views showing an example of the arrangement of a dust sampling apparatus according to the 26th embodiment of the present invention.
Figure 46B:
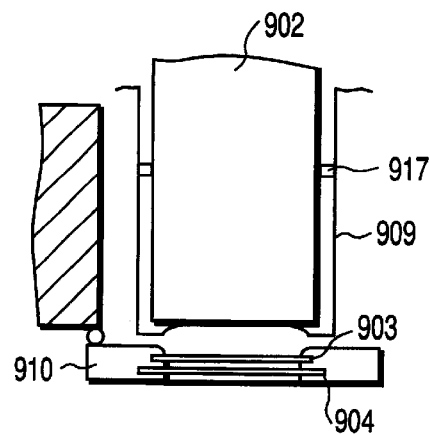

FIGS. 46A and 46B are schematic views showing an example of the arrangement of a dust sampling apparatus of the 25th embodiment. FIG. 46A shows the overall arrangement of the dust sampling apparatus. FIG. 46B shows the main part of the apparatus. The same reference numerals in this embodiment denote the same parts as in the embodiment shown in FIGS. 45A and 45B, and a detailed description thereof will be omitted.

As shown in FIGS. 46A and 46B, the dust sampling apparatus of this embodiment is constituted by a chamber 901, a radiation detector 902, filter paper 903, a paper filter receiving wire net 904, a flow path agitating detector holder 909, a flow path agitating filter paper holder 910, a detector O-ring 917, and a paper filter holder O-ring 918.

The flow path agitating filter paper holder 910 is mounted on the chamber 901 to hold the filter paper 903 and the paper filter receiving wire net 904. As shown in FIGS. 46A and 46B, the flow path agitating filter paper holder 910, in particular, serves to narrow the flow path of air to the filter paper 903, together with the flow path agitating detector holder 909.

The flow path agitating detector holder 909 is mounted on the chamber 901 to hold the radiation detector 902 in the center of the chamber 901. As shown in FIGS. 46A and 46B, the flow path agitating detector holder 909, in particular, serves to narrow the flow path of air to the filter paper 903, together with the flow path agitating filter paper holder 910.

The detector O-ring 917 prevents leakage of air through the gap between the radiation detector 902 and the detector holder 906. The paper filter holder O-ring 918 prevents leakage of air through the gap between the flow path agitating filter paper holder 910 and the chamber 901.

In the dust sampling apparatus having this arrangement, when air is drawn into the chamber 901 through its inlet, the air passes through the narrow gap defined between the flow path agitating detector holder 909 and the flow path agitating filter paper holder 910. Since the space into which the air enters through the narrow gap exponentially widens along the flow path, the air that has passed through the gap becomes a turbulent flow. The pressure distribution of air with respect to the filter paper 903 is made uniform by this turbulent flow. With this operation, dust can be uniformly captured, and the air after dust capturing is exhausted through the outlet of the chamber 901.

As described above, according to this embodiment, a constricted gap is defined between the flow path agitating detector holder 909 and the flow path agitating filter paper holder 910, and the space into which the air enters through the constricted gap exponentially widens along the flow path. With this structure, the air that has passed through the gap between the flow path agitating detector holder 909 and the flow path agitating filter paper holder 910 becomes a turbulent flow. As a result, the flow path of air passing through the filter paper 903 is made uniform, and hence dust can be uniformly captured.

(27th Embodiment)

Figure 47A:
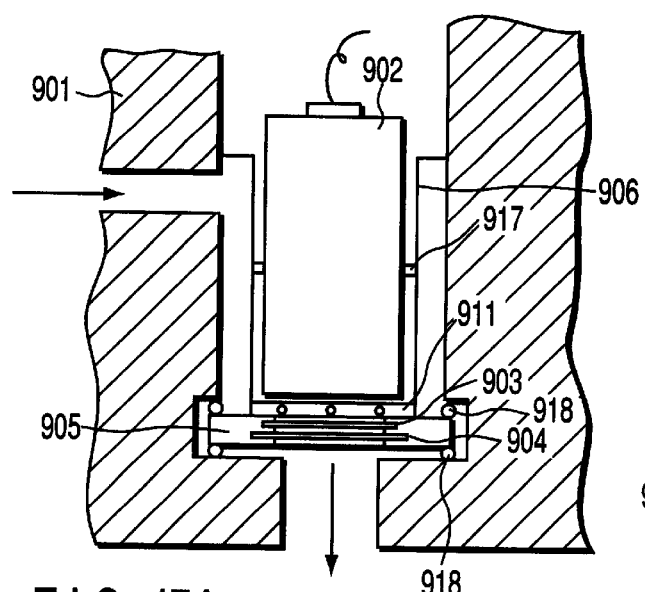
FIGS. 47A and 47B are views showing an example of the arrangement of a dust sampling apparatus according to the 27th embodiment of the present invention.
Figure 47B:
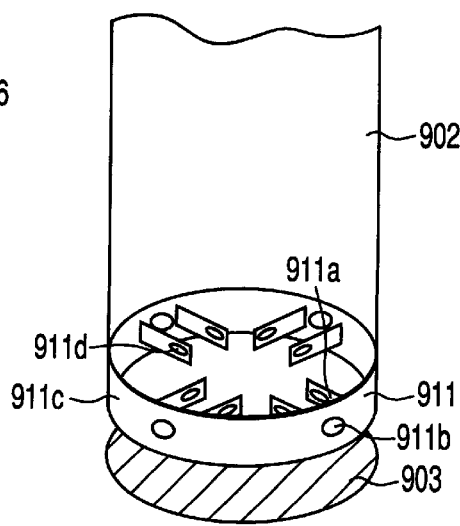

FIGS. 47A and 47B are schematic views showing an example of the arrangement of a dust sampling apparatus of the 27th embodiment. FIG. 47A shows the overall arrangement of the dust sampling apparatus. FIG. 47B shows the main part of the apparatus. The same reference numerals in this embodiment denote the same parts as in the embodiment shown in FIGS. 45A and 45B, and a detailed description thereof will be omitted.

As shown in FIGS. 47A and 47B, the dust sampling apparatus of this embodiment is constituted by a chamber 901, a radiation detector 902, filter paper 903, a paper filter receiving wire net 904, a filter paper holder 905, a detector holder 906, a flow path agitating skirt 911, a detector O-ring 917, and a paper filter holder O-ring 918.

The flow path agitating skirt 911 is placed between the radiation detector 902 and the filter paper 903 to agitate the flow path of drawn air. The flow path agitating skirt 911 is made up of a circular skirt main body 911c, inlets 911b formed in the skirt main body 911c at equal intervals, and flow path guides 911a for drawing the air flowing through the inlets 911b into the flow path agitating skirt 911 and dispersing the air. Air agitating openings 911d are formed in the flow path guides 911a.

In the dust sampling apparatus having this arrangement, when air is drawn through the inlet of the chamber 901, the air flows through the inlets 911b of the flow path agitating skirt 911. The air flowing through the inlets 911b is drawn into the center of the filter paper 903 by the flow path guides 911a and is randomly agitated by the air agitating openings 911d. The pressure distribution of air with respect to the filter paper 903 is made uniform by the air whose flow path is agitated in this manner. With this operation, dust can be uniformly captured, and the air after dust capturing is exhausted through the outlet of the chamber 901.

As described above, according to this embodiment, since the apparatus has the flow path agitating skirt 911, the flow path of drawn air is agitated. As a result, the flow path of air passing through the filter paper 903 is made uniform, and hence dust can be uniformly captured.

(28th Embodiment)

Figure 48A:
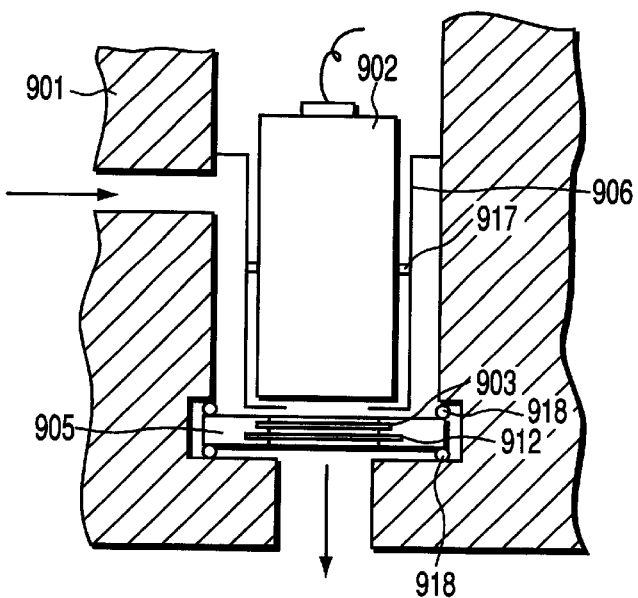
FIGS. 48A and 48B are views showing an example of the arrangement of a dust sampling apparatus according to the 28th embodiment of the present invention.
Figure 48B:
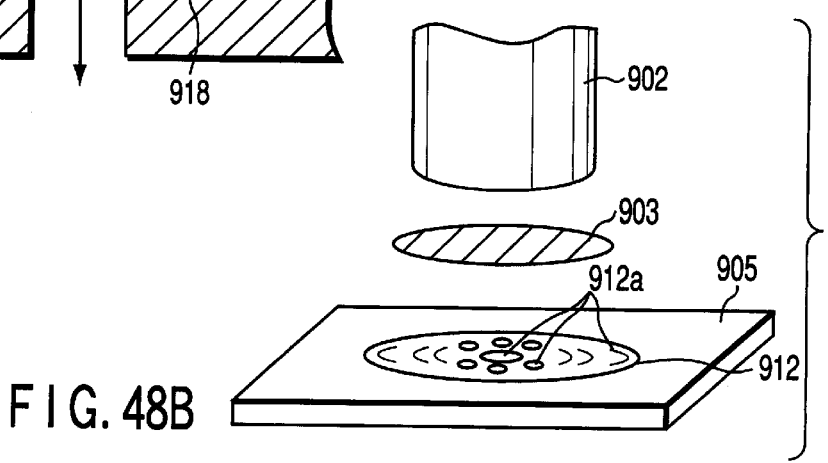

FIGS. 48A and 48B are schematic views showing an example of the arrangement of a dust sampling apparatus according to the 28th embodiment. FIG. 48A shows the overall arrangement of the dust sampling apparatus. FIG. 48B shows the main part of this apparatus. The same reference numerals in this embodiment denote the same parts as in the embodiment shown in FIGS. 45A and 45B, and a detailed description thereof will be omitted.

As shown in FIGS. 48A and 48B, the dust sampling apparatus of this embodiment is made up of a chamber 901, a radiation detector 902, filter paper 903, a pressure loss correction wire net 912, a filter paper holder 905, a detector holder 906, a detector O-ring 917, and a paper filter holder O-ring 918.

The pressure loss correction wire net 912 prevents the filter paper 903 from being destroyed by the drawing pressure, and performs correction such that the pressure loss decreases toward the center of the filter paper 903. The pressure loss correction wire net 912 has a plurality of inlets (holes) 912a whose sizes differ at the center and periphery such that the pressure loss decreases toward the center of the filter paper 903. As shown in FIG. 48B, the inlets 912a increase in size toward the center of the pressure loss correction wire net 912, and decrease in size toward its periphery.

The filter paper holder 905 is mounted on the chamber 901 to hold the filter paper 903 and the pressure loss correction wire net 912.

In the dust sampling apparatus having this arrangement, when air is drawn into the chamber 901 through its inlet, the air is sent to the filter paper 903. At this time, the pressure loss correction wire net 912 acts to increase the flow rate of air toward the center where the pressure loss is small in accordance with the pressure loss distribution set on the pressure loss correction wire net 912. Meanwhile, the gap between the radiation detector 902 and the filter paper holder 905 acts to decrease the flow rate toward the center of the filter paper 903. Since these two actions cancel out each other, the flow path of air passing through the filter paper 903 is made uniform. With this operation, dust can be uniformly captured, and the air after dust capturing is exhausted through the outlet of the chamber 901.

As described above, according to this embodiment, since the apparatus includes the pressure loss correction wire net 912 that acts to increase the flow rate of air toward the center where the pressure loss is small, the flow path of air passing through the filter paper 903 is made uniform, and dust can be uniformly captured.

(29th Embodiment)

Figure 49A:
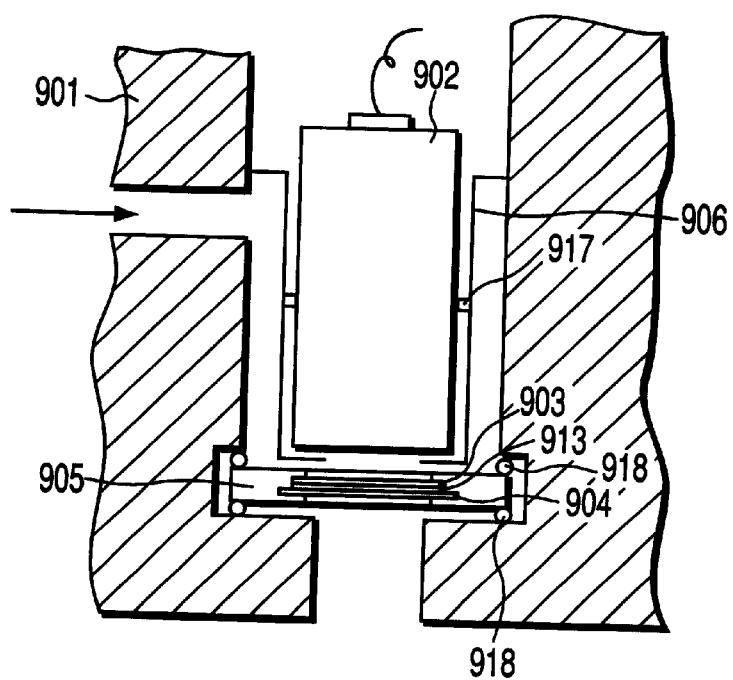
FIGS. 49A and 49B are views showing an example of the arrangement of a dust sampling apparatus according to the 29th embodiment of the present invention.
Figure 49B:
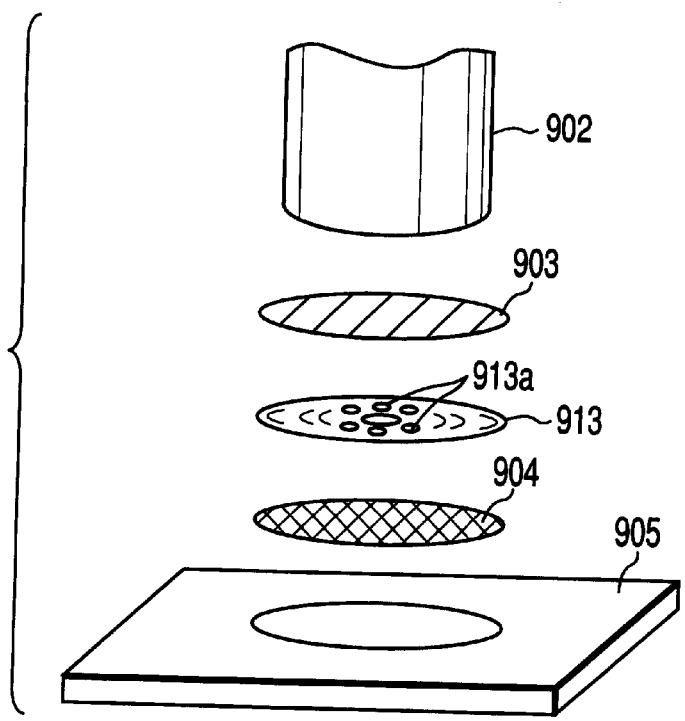

FIGS. 49A and 49B are schematic views showing an example of the arrangement of a dust sampling apparatus of the 29th embodiment. FIG. 49A shows the overall arrangement of the dust sampling apparatus. FIG. 49B shows the main part of this apparatus. The same reference numerals in this embodiment denote the same parts as in the embodiment shown in FIGS. 45A and 45B, and a detailed description thereof will be omitted.

As shown in FIGS. 49A and 49B, the dust sampling apparatus of this embodiment is made up of a chamber 901, a radiation detector 902, filter paper 903, pressure loss correction filter paper 913, a paper filter receiving wire net 904, a filter paper holder 905, a detector holder 906, a detector O-ring 917, and a paper filter holder O-ring 918.

The pressure loss correction filter paper 913 is inserted between the filter paper 903 and the paper filter receiving wire net 904 and made of the same material as that for the filter paper 903 to have the same shape as that of the paper filter receiving wire net 904. The pressure loss correction filter paper 913 has a plurality of inlets 913a that differ in size at the center and periphery such that the pressure loss decreases toward the center of the filter paper 903. As shown in FIGS. 49A and 49B, the inlets 913a increase in size toward the center of the pressure loss correction filter paper 913 and decrease in size toward its periphery.

The filter paper holder 905 is mounted on the chamber 901 to hold the filter paper 903, the pressure loss correction filter paper 913, and the paper filter receiving wire net 904.

The material for the pressure loss correction filter paper 913 need not be limited to the same material as that for the filter paper 903, and another material may be used. For example, any sheet-like material having openings to ensure the same effect as that described above can be used.

In the dust sampling apparatus having this arrangement, when air is drawn through the inlet of the chamber 901, dust in the air is sent to the filter paper 903. At this time, the pressure loss correction filter paper 913 acts to increase the flow rate of air toward the center where the pressure loss is small in accordance with the pressure loss distribution set on the pressure loss correction filter paper 913. Meanwhile, the gap between the radiation detector 902 and the filter paper holder 905 acts to decrease the flow rate toward the center of the filter paper 903. Since these two actions cancel out each other, the flow path of air passing through the filter paper 903 is made uniform. With this operation, dust can be uniformly captured, and the air after dust capturing is exhausted through the outlet of the chamber 901.

As described above, according to this embodiment, since the apparatus includes the pressure loss correction filter paper 913 that acts to increase the flow rate of air toward the center where the pressure loss is small, the flow path of air passing through the filter paper 903 is made uniform, and dust can be uniformly captured.

(30th Embodiment)

Figure 50A:
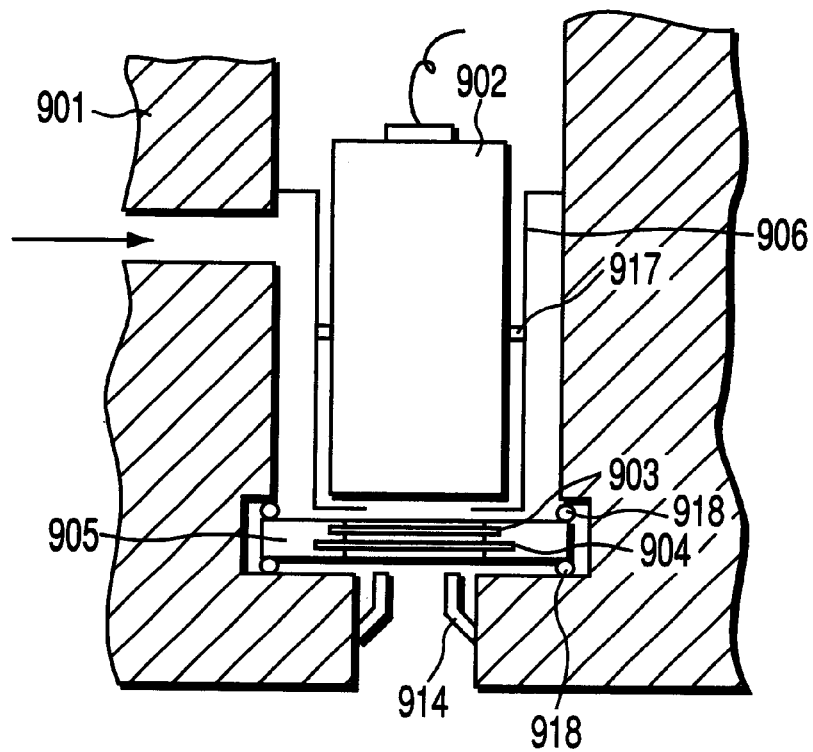
FIGS. 50A and 50B are views showing an example of the arrangement of a dust sampling apparatus according to the 30th embodiment of the present invention.
Figure 50B:
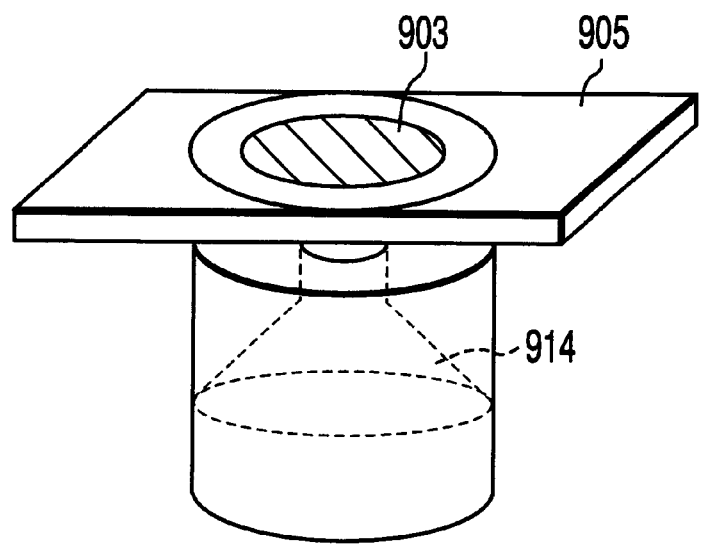

FIGS. 50A and 50B are schematic views showing an example of the arrangement of a dust sampling apparatus according to the 30th embodiment. FIG. 50A shows the overall arrangement of the dust sampling apparatus. FIG. 50B shows the main part of this apparatus. The same reference numerals in this embodiment denote the same parts as in the embodiment shown in FIGS. 45A and 45B, and a detailed description thereof will be omitted.

As shown in FIGS. 50A and 50B, the dust sampling apparatus of this embodiment is made up of a chamber 901, a radiation detector 902, filter paper 903, a paper filter receiving wire net 904, a filter paper holder 905, a detector holder 906, a detector O-ring 917, a paper filter holder O-ring 918, and a restriction pipe 914.

The restriction pipe 914 is mounted on a lower portion of the chamber 901 and shaped to intensively draw the air at the center of the filter paper 903 and increase the flow rate of air toward the center of the filter paper 903.

In the dust sampling apparatus having this arrangement, when air is drawn through the inlet of the chamber 901, the air is sent to the filter paper 903. At this time, the restriction pipe 914 intensively draws the air at the center of the filter paper 903, and hence acts to increase the flow rate of air toward the center of the filter paper 903. Meanwhile, the gap between the radiation detector 902 and the filter paper holder 905 acts to decrease the flow rate toward the center of the filter paper 903. Since these two actions cancel out each other, the flow path of air passing through the filter paper 903 is made uniform. With this operation, dust can be uniformly captured, and the air after dust capturing is exhausted through the outlet of the chamber 901.

As described above, according to this embodiment, since the apparatus includes the restriction pipe 914 that acts to increase the flow rate of air toward the center of the filter paper 903, the flow path of air passing through the filter paper 903 is made uniform, and dust can be uniformly captured.

(31st Embodiment)

Figure 51A:
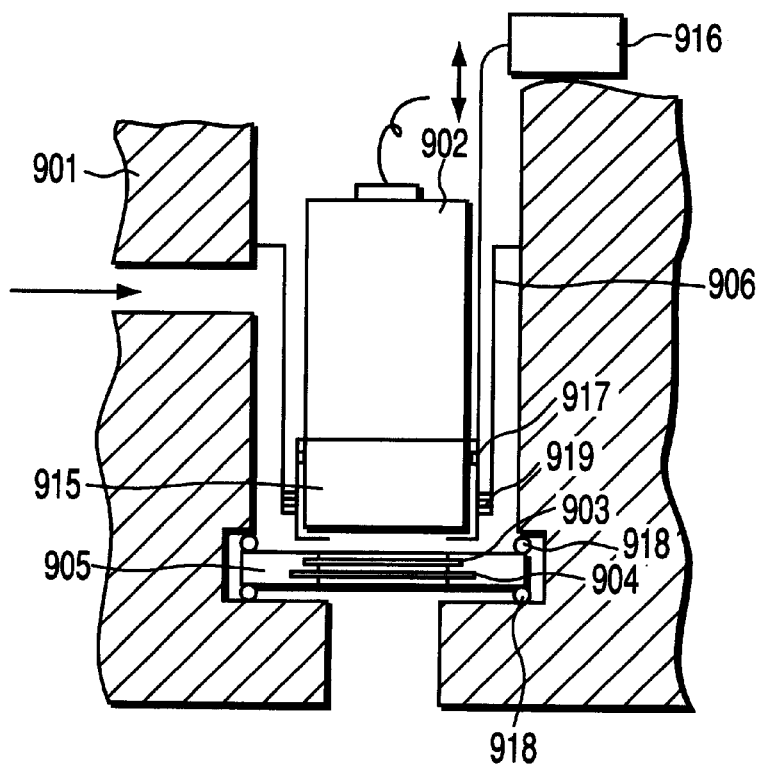
FIGS. 51A and 51B are views showing an example of the arrangement of a dust sampling apparatus according to the 31st embodiment of the present invention.
Figure 51B:
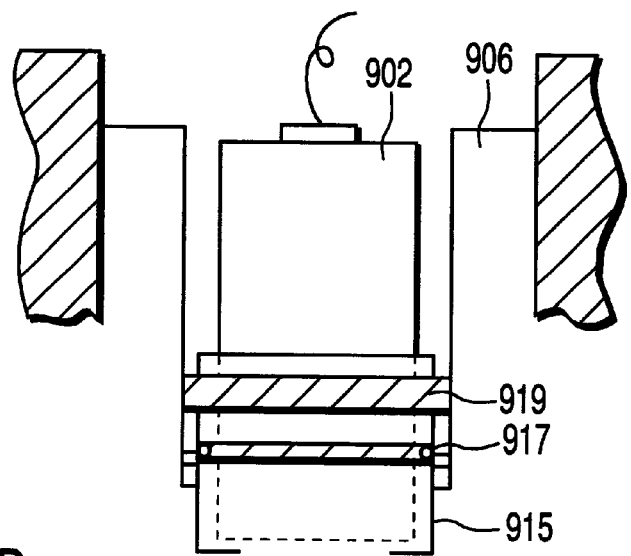

FIGS. 51A and 51B are schematic views showing an example of the arrangement of a dust sampling apparatus according to the 31st embodiment. FIG. 51A shows the overall arrangement of the dust sampling apparatus. FIG. 51B shows the main part of this apparatus. The same reference numerals in this embodiment denote the same parts as in the embodiment shown in FIGS. 45A and 45B, and a detailed description thereof will be omitted.

As shown in FIGS. 51A and 51B, the dust sampling apparatus of this embodiment is made up of a chamber 901, a radiation detector 902, filter paper 903, a paper filter receiving wire net 904, a filter paper holder 905, a detector driving holder 915, a detector driving section 916, a detector holder 906, a driving holder packing 919, a detector O-ring 917, and a paper filter holder O-ring 918.

The detector driving holder 915 holds the radiation detector 902. The detector driving holder 915 is held in the center of the chamber 901 by the detector holder 906, and moves vertically together with the radiation detector 902 when driven by the detector driving section 916 (to be described later).

The detector driving section 916 vertically moves the detector driving holder 915 holding the radiation detector 902, as needed. This moving operation serves to adjust the distance between the filter paper 903 and the radiation detector 902.

The detector holder 906 is mounted on the chamber 901 to hold the detector driving holder 915, which holds the radiation detector 902, in the center of the chamber 901.

The driving holder packing 919 prevents leakage of air through the gap between the radiation detector 902 and the detector driving holder 915, and allows the detector driving holder 915 to move up and down.

In the dust sampling apparatus having this arrangement, in dust sampling operation, a sufficient gap is ensured between the filter paper 903 and the radiation detector 902 by vertically moving the driving detector holder 915 holding the radiation detector 902 by using the detector driving section 916. With this operation, the flow path of air passing through the filter paper 903 is made uniform, and dust is uniformly captured. In addition, in radiation measurement operation, the detector driving section 916 moves the driving detector holder 915 downward to bring the dust collection section 2 close to the filter paper 903. With this operation, radiation can be measured from the filter paper 903, from which dust is uniformly captured, with improved detection sensitivity.

As described above, according to this embodiment, the radiation detector 902 can be moved vertically by using the detector driving section 916 to repeatedly perform the above operation in dust sampling and the above operation in radiation measurement at predetermined time intervals, thereby uniformly capturing dust. In addition, radiation can be measured from the filter paper 903, from which dust is uniformly captured, with improved detection sensitivity.

In the above dust sampling apparatuses, the sampling target is air. However, the present invention is not limited to this and can be applied to a specific gas, other than air, which is exhausted from a pipe of a device.

As has been described above, according to the dust sampling apparatus of the present invention described with reference to the 25th to 31st embodiments, the flow path of air passing through filter paper is made uniform, and dust is uniformly captured. This can prevent a decrease in detection efficiency due to self-absorption of dust and a sensitivity calibration deviation with respect a calibration ray source.

The present invention is not limited to the embodiments described above, and various changes and modifications can be made within the spirit and scope of the invention. For example, the contents of the respective embodiments can be selectively combined and executed. In addition, sampling targets in the dust sampling apparatus may include a specific gas and the like exhausted from a pipe of a device as well as air.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dust radiation monitor apparatus for detecting radiation emitted from dust collected in a dust collection section and determining the presence/absence of radioactive contamination, comprising:

an $\alpha$ ray detection section and $\beta$ ray detection section having an $\alpha$ ray detection layer and $\beta$ ray detection layer arranged to be substantially flush with each other and configured to independently detect $\alpha$ and $\beta$ rays without mixing the rays;

an $\alpha$ ray measuring section and $\beta$ ray measuring section for separately obtaining an $\alpha$ ray measurement value and $\beta$ ray measurement value from the independently detected $\alpha$ and $\beta$ rays; and a data processing section for calculating a $\beta$ ray value of a natural nuclide by multiplying the $\alpha$ ray measurement value by an emission ratio between $\alpha$ and $\beta$ rays emitted from the natural nuclide which is obtained in advance as a correction coefficient, and performing contamination determination by using a value obtained by subtracting the calculated $\beta$ ray value from the $\beta$ ray measurement value.

2. A dust radiation monitor apparatus for detecting radiation emitted from dust collected in a dust collection section and determining the presence/absence of radioactive contamination, comprising:

an $\alpha$ ray detection section and $\beta$ ray detection section having an $\alpha$ ray detection layer and $\beta$ ray detection layer arranged to be substantially flush with each other and configured to independently detect $\alpha$ and $\beta$ rays without mixing the rays;

an $\alpha$ ray measuring section and $\beta$ ray measuring section for separately obtaining an $\alpha$ ray measurement value and $\beta$ ray measurement value from the independently detected $\alpha$ and $\beta$ rays; and a data processing section capable of selectively performing mode setting between a first mode of measuring a natural nuclide and a second mode of measuring a dust radioactivity concentration, said data processing section being configured to obtain an emission ratio of $\alpha$ and $\beta$ rays emitted from the natural nuclide measured in the first mode as a correction coefficient, calculate a $\beta$ ray value of the natural nuclide by multiplying the $\alpha$ ray measurement value measured in the second mode by the correction coefficient, and perform contamination determination by using a value obtained by subtracting the calculated $\beta$ ray value from the $\beta$ ray measurement value measured in the second mode.

3. An apparatus according to claim 1, wherein said data processing section evaluates a change in a predetermined condition which becomes a factor that causes a variation in a natural nuclide, and corrects a change in the correction coefficient which is caused by the change in the condition.

4. An apparatus according to claim 3, wherein said dust radiation monitor apparatus further comprises a ventilating blower for changing air containing dust as a measurement target, and said data processing section evaluates a relationship between an elapsed time from a start of an active/inactive state of said ventilating blower, and corrects a change in the correction coefficient which is caused by a change in natural nuclide concentration.

5. An apparatus according to claim 3, wherein said data processing section stores the condition when the correction coefficient is larger than a predetermined value.

6. An apparatus according to claim 3, wherein said data processing section stores the condition when the dust radioactivity concentration is higher than a predetermined value.

7. An apparatus according to claim 1, wherein the $\alpha$ ray detection layer is made up of a plurality of wavelength shift fibers coated with ZnS(Ag), the $\beta$ ray detection layer is made up of a plurality of plastic scintillation fibers, said $\alpha$ ray detection section further comprises an $\alpha$ ray photomultiplier for converting a detection signal from a fiber which has detected an $\alpha$ ray into an electrical signal, and said $\beta$ ray detection section further comprises a $\beta$ ray photomultiplier for converting a detection signal from a fiber which has detected a $\beta$ ray into an electrical signal.

8. An apparatus according to claim 1, wherein the $\alpha$ ray detection layer is made of a ZnS(Ag) layer, and the $\beta$ ray detection layer is made of a plurality of plastic scintillator layers, said $\alpha$ ray detection section further comprises an $\alpha$ ray fiber for optically transmitting an $\alpha$ ray detection signal from the $\alpha$ ray detection layer, and an $\alpha$ ray photomultiplier for converting the optically transmitted $\alpha$ ray detection signal into an electrical signal, and said $\beta$ ray detection section further comprises a $\beta$ ray fiber for optically transmitting a $\beta$ detection signal from the $\beta$ ray detection layer, and a $\beta$ ray photomultiplier for converting the optically transmitted $\beta$ ray detection signal into an electrical signal.

9. An apparatus according to claim 1, wherein the $\alpha$ ray detection layer is made of a ZnS(Ag) layer, the $\beta$ ray detection layer is made of a plurality of plastic scintillator layers, said $\alpha$ ray detection section further comprises an $\alpha$ ray light guide for guiding $\alpha$ ray detection signals detected at an entire surface of the $\alpha$ ray detection layer to one point, and an $\alpha$ ray photomultiplier for converting the guided $\alpha$ ray detection signals into an electrical signal, and said $\beta$ ray detection section further comprises a $\beta$ ray light guide for guiding $\beta$ ray detection signals detected at an entire surface of the $\beta$ ray detection layer to one point, and a $\beta$ ray photomultiplier for converting the guided $\beta$ ray detection signals into an electrical signal.

10. An apparatus according to claim 1, wherein an area of the $\beta$ ray detection layer is larger than an area of the $\alpha$ ray detection layer.

11. An apparatus according to claim 1, wherein said $\beta$ ray detection section further comprises a filter which is provided between the β ray detection layer and said dust collection section to cut α rays and transmit β rays.

12. An apparatus according to claim 11, wherein said filter has a hole formed in a portion thereof and is capable of moving a position of the hole to allow radiation from which no α ray is cut and radiation from which an α ray is cut to be selectively detected at the β ray detection layer.

13. An apparatus according to claim 1, wherein the α ray detection layer is made of a wavelength shift fiber coated with ZnS(Ag) and surrounds a periphery of the β ray detection layer, and said α ray detection section further comprises an α ray photomultiplier for converting an α ray detection signal transmitted through the fiber into an electrical signal.

14. A dust radiation monitor apparatus for collecting dust in air into a dust collection section and measuring a radioactivity concentration of the dust by using a counted value of radiation from the dust in said dust collection section, comprising:

pipe switching means for switching connections between a radiation monitor side and a plurality of sampling pipes which are installed in different sampling places in facilities to introduce air from the respective sampling places;

an intermittent dust radiation monitor for collecting, in a dust collection section, dust in air which is introduced through the sampling pipes sequentially switched by said pipe switching means, and measuring a radioactivity concentration of the dust in said dust collection section; and a continuous dust radiation monitor for collecting, in a dust collection section, dust in air introduced through a fixed sampling pipe switched by said pipe switching means, and measuring the radioactivity concentration of the dust in said dust collection section.

15. A dust radiation monitor apparatus according to claim 14, further comprising means for, when it is detected that the radioactivity concentration of the dust measured by said intermittent dust radiation monitor is higher than a predetermined value, switching connection of the sampling pipe through which the dust is introduced from said intermittent dust radiation monitor to said continuous dust radiation monitor.

16. An apparatus according to claim 14, wherein each of said intermittent dust radiation monitor and said continuous dust radiation monitor comprises flow rate measuring means for measuring a flow rate of air introduced through the sampling pipe switched by said pipe switching means, and said data processing section comprises means for correcting the measured radioactivity concentration of the dust in accordance with the flow rate measured by said flow rate measuring means.

17. An apparatus according to claim 14, further comprising means for calculating a detection limit value every time the radioactivity concentration is measured, and setting a dust collection time to be longer than a normal dust collection time so as to make a radiation reading larger than the detection limit value when the radiation reading is not more than the detection limit value.

18. An apparatus according to claim 14, wherein said pipe switching means comprises a three-way valve having a function of connecting a path to one of said intermittent dust radiation monitor and said continuous dust radiation monitor while closing a path to the other radiation monitor.

19. An apparatus according to claim 18, wherein said three-way valve is replaced with a combination of a one-way valve such as a solenoid valve and a rotating valve which moves to a sampling pipe to be connected and is connected thereto.

20. An apparatus according to claim 18, wherein said three-way valve is replaced with a combination of two rotating valves which move to sampling pipes to be connected and are connected thereto.

21. An apparatus according to claim 14, further comprising means for storing the measured radioactivity concentration of the dust and separately outputting the radioactivity concentration at each measurement point.

22. An apparatus according to claim 14, further comprising a single pump for drawing and collecting dust from both said intermittent dust radiation monitor and said continuous dust radiation monitor.

23. An apparatus according to claim 14, wherein each of said intermittent dust radiation monitor and said continuous dust radiation monitor comprises a pump for drawing and collecting dust from said radiation monitor, and said apparatus includes a bypass pipe provided for an inlet of each of said two pumps through a stop valve.

24. An apparatus according to claim 23, wherein one of said two pumps is used to draw and collect dust in normal operation, and the other pump is used as a backup pump to draw and collect dust when said pump used in normal operation stops due to a failure.

25. A dust radiation monitor apparatus for collecting dust in air into a dust collection section and measuring a radioactivity concentration of the dust by using a counted value of radiation from the dust in said dust collection section, comprising:

pipe switching means for switching connections between a radiation monitor side and a plurality of sampling pipes which are installed in different sampling places in facilities to introduce air from the respective sampling places;

an intermittent dust radiation monitor for collecting, in a dust collection section, dust in air which is introduced through the sampling pipes sequentially switched by said pipe switching means, and measuring a radioactivity concentration of the dust in said dust collection section;

a continuous dust radiation monitor for collecting, in a dust collection section, dust in air introduced through a fixed sampling pipe switched by said pipe switching means, and measuring the radioactivity concentration of the dust in said dust collection section; and a data processing section for collectively performing dust collection control and measurement control for each of said intermittent dust radiation monitor and said continuous dust radiation monitor.

26. An apparatus according to claim 25, wherein at least one of said intermittent dust radiation monitor and said continuous dust radiation monitor comprises an α ray detector and β ray detector for independently detecting α and β rays emitted from a dust collection section.

27. An apparatus according to claim 26, wherein said data processing section obtains an emission ratio of α and β rays emitted from a natural nuclide as a correction coefficient, calculates a β ray value of the natural nuclide by multiplying an α ray measurement value by the correction coefficient, and obtains a β ray value free from influences of the natural nuclide by subtracting the calculated β ray value from a β ray measurement value.

28. An apparatus according to claim 26, wherein said α ray detector and said β ray detector comprise semiconductor detectors.

29. An apparatus according to claim 26, further comprising Ge detectors arranged on the sides of said α ray detector and β ray detector.

30. A dust sampling apparatus comprising:
a chamber for drawing external air and exhausting the air after radiation dust capturing to the outside;
a filter paper holder mounted in said chamber, for holding filter paper for capturing radiation dust from the drawn air;
a radiation detector mounted in said chamber, for detecting radiation from the captured radiation dust; and
a member mounted in said chamber, for agitating a flow path of the drawn air that passes through said filter paper.

31. A dust sampling apparatus comprising:
a chamber for drawing external air and exhausting the air after radiation dust capturing to the outside;
a filter paper holder mounted in said chamber, for holding filter paper for capturing radiation dust from the drawn air;
a radiation detector mounted in said chamber, for detecting radiation from the captured radiation dust; and
a detector holder for holding said radiation detector, wherein said filter paper holder and said detector holder have structures that agitate the flow path of the drawn air that passes between said filter paper holder and said detector holder.

32. A dust sampling apparatus comprising:
a chamber for drawing external air and exhausting the air after radiation dust capturing to the outside;
a filter paper holder mounted in said chamber, for holding filter paper for capturing radiation dust from the drawn air;
a radiation detector mounted in said chamber, for detecting radiation from the captured radiation dust; and
a member which is provided between said radiation detector and the filter paper to agitate a flow path of the drawn air that passes between said radiation detector and said filter paper.

33. A dust sampling apparatus comprising:
a chamber for drawing external air and exhausting the air after radiation dust capturing to the outside;
a filter paper holder mounted in said chamber, for holding filter paper for capturing radiation dust from the drawn air, and holding a filter paper receiving member acting to reduce pressure loss toward a center of the filter paper; and
a radiation detector mounted in said chamber, for detecting radiation from the captured radiation dust.

34. A dust sampling apparatus comprising:
a chamber for drawing external air and exhausting the air after radiation dust capturing to the outside;
a filter paper holder mounted in said chamber, for holding filter paper for capturing radiation dust from the drawn air, and holding pressure loss correction filter paper acting to reduce a pressure loss toward a center of the filter paper; and
a radiation detector mounted in said chamber, for detecting radiation from the captured radiation dust.

35. A dust sampling apparatus comprising:
a chamber for drawing external air and exhausting the air after radiation dust capturing to the outside;
a filter paper holder mounted in said chamber, for holding filter paper for capturing radiation dust from the drawn air;
a radiation detector mounted in said chamber, for detecting radiation from the captured radiation dust; and
a pipe which is installed on an air outlet side of the filter paper to increase a flow rate of air toward a center of the filter paper.

36. A dust sampling apparatus comprising:
a chamber for drawing external air and exhausting the air after radiation dust capturing to the outside;
a filter paper holder mounted in said chamber, for holding filter paper for capturing radiation dust from the drawn air;
a radiation detector mounted in said chamber, for detecting radiation from the captured radiation dust;
a detector holder for holding said radiation detector; and
a driving section for allowing adjustment of a distance between the paper filter and said radiation detector by moving said detector holder.

* * * * *